(12) United States Patent
Kamei et al.

(10) Patent No.: US 11,443,002 B2
(45) Date of Patent: Sep. 13, 2022

(54) INFORMATION PRESENTING METHOD, INFORMATION PRESENTING SYSTEM, AND INFORMATION PRESENTING PROGRAM

(71) Applicant: Panasonic Intellectual Property Corporation of America, Torrance, CA (US)

(72) Inventors: Rinako Kamei, Tokyo (JP); Atsushi Saso, Kanagawa (JP); Mizuho Sakakibara, Tokyo (JP); Motoji Ohmori, Osaka (JP); Mikiko Matsuo, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/125,617

(22) Filed: Dec. 17, 2020

(65) Prior Publication Data

US 2021/0103625 A1 Apr. 8, 2021

Related U.S. Application Data

(63) Continuation of application No. PCT/JP2019/030291, filed on Aug. 1, 2019.

(30) Foreign Application Priority Data

Aug. 2, 2018 (JP) .............................. JP2018-146219

(51) Int. Cl.
*G06F 16/9535* (2019.01)
*G06F 16/9538* (2019.01)
(Continued)

(52) U.S. Cl.
CPC ...... *G06F 16/9535* (2019.01); *G06F 16/9538* (2019.01); *G06Q 50/12* (2013.01); *G06F 3/0482* (2013.01)

(58) Field of Classification Search
CPC . G06F 16/9535; G06F 16/9538; G06F 3/0482
(Continued)

(56) References Cited

U.S. PATENT DOCUMENTS 10,114,884 B1 * 10/2018 Valensi ................... G06F 16/26
2008/0091291 A1 * 4/2008 Roy ...................... G01N 33/146
700/116
(Continued)

FOREIGN PATENT DOCUMENTS

JP 2002-117059 4/2002
JP 2006-293893 10/2006
(Continued)

OTHER PUBLICATIONS

International Search Report issued in international Pat. Appl. No. PCT/JP2019/030291, dated Nov. 6, 2019, along with an English translation thereof.

*Primary Examiner* — Ashish Thomas
*Assistant Examiner* — Abdullah A Daud
(74) *Attorney, Agent, or Firm* — Greenblum & Bernstein, P.L.C.

(57) ABSTRACT

An information presenting method according to the present disclosure includes: acquiring instruction information indicative of a preferred taste of a user with respect to a food product; calculating a first feature quantity indicative of a feature of a taste indicated by the instruction information; calculating, from a food product data base which stores a temporal change in a content of each of one or more components for each of one or more food products, progress information indicative of a temporal change in a second (Continued)

feature quantity indicative of a feature of the taste of each of the food products, extracting a food product for which a distance between the first feature quantity and the progress information is equal to or less than a reference value; and presenting the extracted food product.

17 Claims, 12 Drawing Sheets

(51) Int. Cl.
  *G06Q 50/12* (2012.01)
  *G06F 3/0482* (2013.01)
(58) Field of Classification Search
  USPC .................................................. 707/790, 769
  See application file for complete search history.

(56) References Cited

U.S. PATENT DOCUMENTS

| | | | |
|---|---|---|---|
| 2009/0081394 A1* | 3/2009 | Carew | B32B 27/34 |
| | | | 428/480 |
| 2016/0239538 A1* | 8/2016 | Gaza | G06F 16/245 |
| 2017/0169241 A1* | 6/2017 | Unagami | G06F 12/1408 |

FOREIGN PATENT DOCUMENTS

| | | | |
|---|---|---|---|
| JP | 2006293893 | * | 10/2006 |
| JP | 2006293893 A | * | 10/2006 |
| JP | 2018-74920 | | 5/2018 |
| JP | 2018074920 | * | 5/2018 |

\* cited by examiner

| | USER ID (U1) | | |
|---|---|---|---|
| DRINK DAY | 2018/7/21/9:00 | 2018/7/21/9:10 | 2018/7/21/9:20 |
| BRAND ID | AA | AB | AC |
| FERMENTATION ID | AA_1 | AB_1 | AC_1 |
| EVALUATION | 5 | 5 | 3 |
| COMMENT | SMOOTH TO THROAT | SAVORY | STRONG SOUR |
| DISH | FRIED CHICKEN | GREEN SOYBEANS | SLICED RAW FISH |

T41

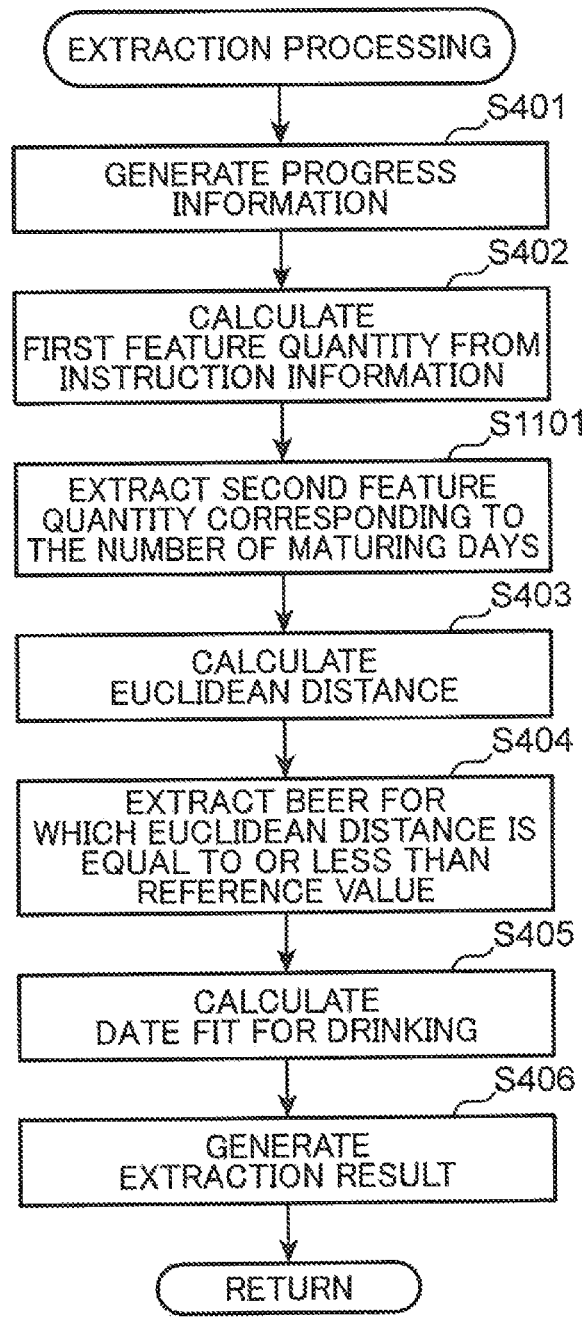

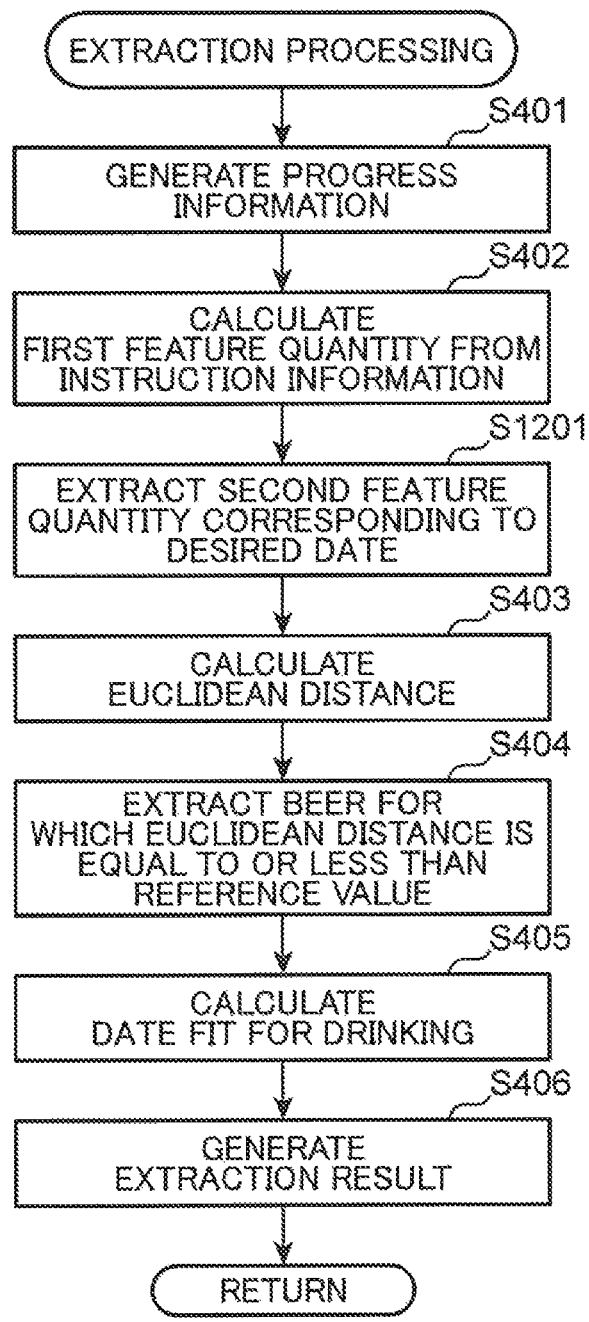

INFORMATION PRESENTING METHOD, INFORMATION PRESENTING SYSTEM, AND INFORMATION PRESENTING PROGRAM

CROSS-REFERENCE TO RELATED APPLICATIONS

This application is a Bypass Continuation of International Application No. PCT/JP2019/030291 filed Aug. 1, 2019, which is based upon and claims the benefit of foreign priority to Japanese Patent Application No. 2018-146219 filed on Aug. 2, 2018. The content of each application is herein incorporated by reference in its entirety.

TECHNICAL FIELD

The present disclosure relates to a technique for searching for a food product meeting a user's preference.

BACKGROUND ART

In recent years, there is provided service on the Internet for searching for a food product with a user's preferred taste and presenting the searched food product to a user.

Patent Literature 1, for example, discloses a technique for causing a user to input a brand of a wine whose taste is known to the user, displaying a taste position of the wine on a taste distribution map, with respect to the position, causing the user to input another spot on the distribution map according to a user's desire such as 'sweeter' than that wine, and searching for a wine with a taste corresponding to the spot to inform the user of the searched wine.

However, the technique recited in Patent Literature 1 needs an improvement since searching for a wine with a user's preferred taste is conducted without consideration of a change in taste due to maturing of the wine.

CITATION LIST

Patent Literature

Patent Literature 1: JP 2002-117059 A

SUMMARY OF INVENTION

An object of the present disclosure is to provide a technique for presenting a food product with a user's preferred taste in consideration of a temporal change in a taste of the food product.

An information presenting system according to one aspect of the present disclosure is an information presenting method in an information presenting system which presents a food product meeting a user's preference, the method including: by a computer of the information presenting system, acquiring instruction information indicative of a preferred taste of the user with respect to the food product; calculating a first feature quantity indicative of a feature of a taste indicated by the instruction information; calculating, from a food product data base which stores a temporal change in a content of each of one or more components for each of one or more food products, progress information indicative of a temporal change in a second feature quantity indicative of a feature of the taste of each of the food products, and extracting a food product for which a distance between the first feature quantity and the progress information is equal to or less than a reference value; and presenting the extracted food product.

According to the present disclosure, it is possible to present a food product with a user's preferred taste in consideration of a temporal change in a taste of the food product.

BRIEF DESCRIPTION OF DRAWINGS

FIG. 4 is a diagram showing one example of a data configuration of an evaluation information DB.

FIG. 11 is a flow chart showing details of extraction processing executed in a second embodiment.

FIG. 12 is a flow chart showing details of extraction processing executed in a third embodiment.

DESCRIPTION OF EMBODIMENTS

Figure 1:
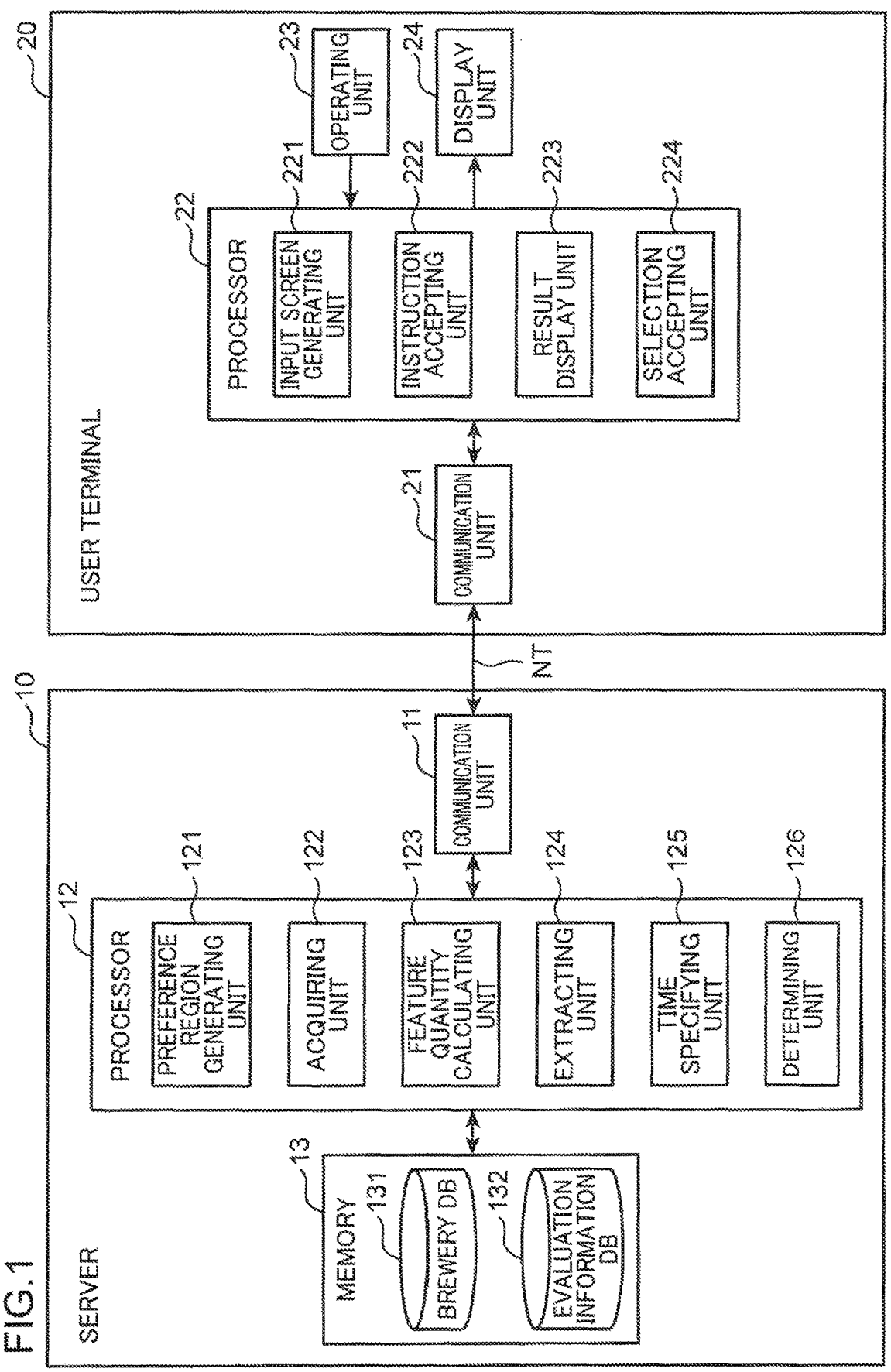
FIG. 1 is a block diagram showing one example of an overall configuration of an information presenting system according to a first embodiment of tire present disclosure.

Embodiments of the present invention will be described below with reference to the accompanying drawings. The following embodiments show one example realizing the present invention and are not intended to limit a technical range of the present invention.

Details Leading to Present Disclosure

With recent diversity of consumers' preferences for taste of beer, a craft beer produced in a small-scaled brewery has become trendy in place of a beer produced by a conventional major manufacturer. The craft beer is produced in about 300 or more breweries all over Japan only, and it is said that there are 1000 or more kinds of recipes for craft beer. Therefore, it is not easy for a user to find out a craft beer with a user's preferred taste, and it is thus demanded to set up a system which enables a user to search for a beer with a user's preferred taste.

While beer produced by a major manufacturer is often shipped after a filtering step and/or a heat sterilization step is conducted last for ensuring transparency as well as preventing over-fermentation caused by residual yeast, large-scale facilities are required for conducting a filtering step and/or a heat sterilization step. Under these circumstances, a craft beer is shipped without a filtering step and/or a heat sterilization step in many cases. This conversely brings about unique tint and taste to the craft beer to make originality of the craft beer stand out, which is enjoyed by consumers. Such an unfiltered craft beer is referred to also as an "unfiltered beer".

Since an unfiltered beer keeps on maturing inside the wood or a bottle due to residual yeast even after shipment, a taste of the beer changes. Thus, managing an unfiltered beer under an appropriate environment even after shipment enables a taste of the unfiltered beer to be further deeper. Therefore, there occurs a case, for example, where an unfiltered beer not meeting a user's preferred taste immediately after shipment changes to meet the user's preferred taste after a lapse of certain days after the shipment. Conversely, there occurs a case where an unfiltered beer meeting a user's preferred taste immediately after shipment becomes a beer not meeting the user's preferred taste after a lapse of certain days after the shipment. Further, there also occurs a case where an unfiltered beer originally having a user's preferred taste becomes a beer more meeting the user's preferred taste after a lapse of certain days after the shipment. As described in the foregoing, not only a taste as a base of the unfiltered beer but also a lapse of days after a shipping date is one of crucial factors for selection.

However, there has conventionally provided no technique that presents a food product with a user's preferred taste in consideration of a taste changing over time after a shipping date.

For example, Patent Literature 1, in which a wine at a taste spot designated by a user on a distribution map is searched for, does not consider at all a change of a taste of the wine from a shipping date in the search. Patent Literature 1 therefore has a problem that a wine meeting a user's preference cannot be presented in consideration of a temporal change in a taste of the wine.

The present disclosure has been made in order to solve such a problem, and an object of the present disclosure is to provide a technique for presenting a food product with a user's preferred taste in consideration of a temporal change in a taste of the food product.

An information presenting system according to one aspect of the present disclosure is an information presenting method in an information presenting system which presents a food product meeting a user's preference, the method including: by a computer of the information presenting system, acquiring instruction information indicative of a preferred taste of the user with respect to the food product; calculating a first feature quantity indicative of a feature of a taste indicated by the instruction information; calculating, from a food product data base which stores a temporal change in a content of each of one or more components for each of one or more food products, progress information indicative of a temporal change in a second feature quantity indicative of a feature of the taste of each of the food products, and extracting a food product for which a distance between the first feature quantity and the progress information is equal to or less than a reference value; and presenting the extracted food product.

According to the configuration, a food product is extracted for which a distance is equal to or less than a reference value, the distance being between the first feature quantity indicative of a feature of a user's preferred taste, and the progress information indicative of a temporal change in the second feature quantity indicative of a feature of a taste of each food product stored in the food product data base, and the extracted food product is presented to the user. Therefore, the present configuration enables a food product with a user's preferred taste to be presented in consideration of a temporal change in a taste of a food product.

The above aspect may further include specifying a time when the extracted food product comes to have a taste suited to the preferred taste of the user using the distance, in which the presentation may further include presenting the specified time.

According to the configuration, the extracted food product can be presented to a user together with a time to consume the extracted food product.

In the above aspect, the time may represent a time on a basis of a shipping date of the food product.

According to the configuration, since a time elapsed from a shipping date is presented, a user can appropriately determine a time to purchase the food product and time to consume the food product after the purchase.

In the above aspect, the instruction information may include one or more parameters constituting the first feature quantity.

According to the configuration, since the instruction information includes one or more parameters constituting the first feature quantity, a user's preferred taste can be converted into a numerical value with ease.

In the above aspect, the instruction information may further include a number of maturing days elapsed after the shipping date of the food product, and the extraction may include specifying the second feature quantity corresponding to the number of maturing days from the progress information, and extracting a food product for which a distance between the specified second feature quantity and the first feature quantity is equal to or less than the reference value.

According to the configuration, a food product having a user's preferred taste can be presented to the user at a time point where a user's desired number of maturing days have elapsed.

In the above aspect, the instruction information may include a desired consumption date of the food product, and the extraction may further include specifying the second feature quantity corresponding to the desired consumption date from the progress information, and extracting a food product for which a distance between the specified second feature quantity and the first feature quantity is equal to or less than the reference value.

According to the configuration, a food product having a user's preferred taste can be presented to the user on a desired consumption date when a user desires to consume the food product.

The above aspect may include displaying an input screen of the instruction information on an information terminal of the user, in which the input screen may include a coordinate space image indicative of coordinate spaces in a plurality of dimensions for inputting a plurality of parameters constituting the first feature quantity.

According to the configuration, since the coordinate space image for inputting a plurality of parameters constituting the first feature quantity is displayed on the input screen, a user is allowed to input the instruction information with ease.

The above aspect may include acquiring, front a memory, evaluation information which associates the food product consumed by the user in past with an evaluation value indicative of evaluation of the food product, and component information indicative of a content of each of one or more components for the food product; and calculating a preference region indicative of a region, on the coordinate space, indicative of a taste preference of the user from the acquired evaluation information and component information, and displaying the calculated preference region in the coordinate space image.

According to the configuration, since the preference region indicative of a taste preference of a user is displayed on the coordinate space image by using the evaluation information including a food product consumed by the user in the past and a user's evaluation value for the food product, the user can input the instruction information with more ease while referring to the user's preference region.

In the above aspect, the input screen may display a brand of the presented food product and a position, in the coordinate space, of a feature quantity of the taste of the presented food product so as to be associated with each other.

According to the configuration, since a brand of a presented food product is displayed in association with a position, in the coordinate space, of a feature quantity of a taste of the food product, a user can recognize the brand of the presented food product and the feature quantity of the taste with ease.

In the above aspect, the instruction information may be calculated from evaluation information, which associates the food product consumed by the user in past with an evaluation value indicative of evaluation of the food product, and component information indicative of a content of each of one or more components for the food product, and the instruction information may be configured with a preference region displayed on a coordinate space having a plurality of parameters constituting the first feature quantity as coordinate axes.

According to the configuration, since a preference region is acquired as the instruction information, the preference region being generated from an evaluation value for a food product taken by a user in the past, a food product meeting a user's preference can be presented without causing a user to input the user's desired taste.

In the above aspect, the food product data base may store a temporal change in a representative value of a content of each of one or more components for each of the food products and store a reference content of each of the one or more components for each of the food products, and the above aspect may further include referring to measurement information which associates, with respect to each of the food products, the shipping date with a measurement value of each of the components on the shipping date, correcting, with respect to each of the food products, a content stored in the food product data base on a basis of a difference between the reference content and the measurement value, and calculating the progress information using the corrected content.

According to the configuration, a content of each component stored in the food product data base is corrected on the basis of a difference between a measurement value of each component of each food product indicated by the measurement information and a reference content (production recipe) of each component of each food product, and progress information is calculated using the corrected content. Therefore, the progress information can be corrected taking into consideration a deviation, from the production recipe, in a measurement value of each component of an actually produced food product. Then, since a food product meeting a user's preference is extracted using the corrected progress information, a food product meeting a user's preference can be more accurately extracted.

In the above aspect, the food product may be an unfiltered beer.

According to the configuration, with respect to an unfiltered beer having a change in taste from a shipping date as one of crucial factors for selection, an unfiltered beer having a user's preferred taste can be presented to the user in consideration of a change in taste from the shipping date.

In the above aspect, the first feature quantity and the second feature quantity may each include at least a first parameter indicative of bitterness and a second parameter indicative of flavor.

According to the configuration, a feature quantity of a taste of an unfiltered beer can be defined in consideration of bitterness and flavor which characterize u taste of an unfiltered beer.

In the above aspect, the food product may be a fermented food product or an alcoholic drink.

According to the configuration, with respect to food products whose taste changes over time, such as fermented food products including cheese, pickles, yoghurt, and the like, or alcohol food products including wine, whisky, Japanese sake, and the like, a food product meeting a user's preference can be presented to a user in consideration of a taste change.

First Embodiment

FIG. 1 is a block diagram showing one example of an overall configuration of an information presenting system according to a first embodiment of the present disclosure. The present information presenting system is a system which presents a food product meeting a user's preference. Here, description will be made with respect to a beer as an example of a food product. Among various kinds of beers, an unfiltered beer is particularly adopted which is not subjected to a filtering step and/or a heat sterilization step, keeps on maturing due to residual yeast even after shipment, and has a taste changing over time from a shipping date (hereinafter, simply described as "beer"). This is one example only and any alcoholic drink can be adopted that matures and has a taste changing even after shipment, such as wine and low-class distilled spirits other than beer. A food product is not limited to an alcoholic drink, and a fermented food product such as cheese or yoghurt may be adopted.

The present information presenting system is provided with a server 10 and a user terminal 20. The server 10 is configured with, for example, a cloud server including one or more computers. The user terminal 20 is a terminal owned by a user who receives service in the present information presenting system. The user terminal 20 may be configured with a portable computer such as a smart phone, a tablet terminal, and a mobile phone, or with a stationary computer such as a desktop computer.

Although in the example shown in FIG. 1, only one user terminal 20 is illustrated for the sake of explanation, the present disclosure is not limited thereto and the system may be configured with a plurality of user terminals 20. In this case, each user terminal 20 is managed by a user ID of a user as an owner of the user terminal. The server 10 stores, in a memory 13, a personal information data base (not shown) in which with a user ID as a key, personal information such as a user' name is associated with a communication address of the user terminal 20, and communicates with each user terminal 20 by using the personal information data base.

The server 10 and the user terminal 20 are connected with each other to be communicable via a network NT. As a network NT, for example, WAN (Wide Area Network) such as an Internet communication network and a mobile phone communication network can be adopted.

The server 10 is provided with a communication unit 11, a processor 12, and the memory 13. The communication unit 11 is configured with a communication circuit which connects the server 10 to the network NT.

The processor 12 is configured with, e.g., a CPU, and is provided with a preference region generating unit 121, an acquiring unit 122, a feature quantity calculating unit 123, an extracting unit 124, a time specifying unit 125, and a determining unit 126. The configuration of the processor 12 may be realized by execution, by the processor 12, of a program which is stored in the memory 13 and which causes a computer to function as the server 10 of the present information presenting system, or may be realized by a dedicated electric circuit.

The preference region generating unit 121 generates a user's preference region by using evaluation information which is stored in an evaluation information DB 132 and which stores evaluation of a beer drunk by the user in the past, and a measurement value of a content of each of one or more components constituting the beer evaluated by a user, the measurement value being stored in the brewery DB 131. Here, the preference region is a region indicative of a user's preferred taste displayed on a coordinate space having a plurality of parameters constituting a feature quantity of a taste of beer as coordinate axes. The preference region generating unit 121 transmits the generated preference region to the user terminal 20 by using the communication unit 11. As a result, the preference region is displayed on an input screen G1 (see FIG. 10) for a user to input instruction information to be described later in the user terminal 20, and is used as a guide by a user when inputting instruction information. Details of generation of the preference region will be described later.

Figure 10:
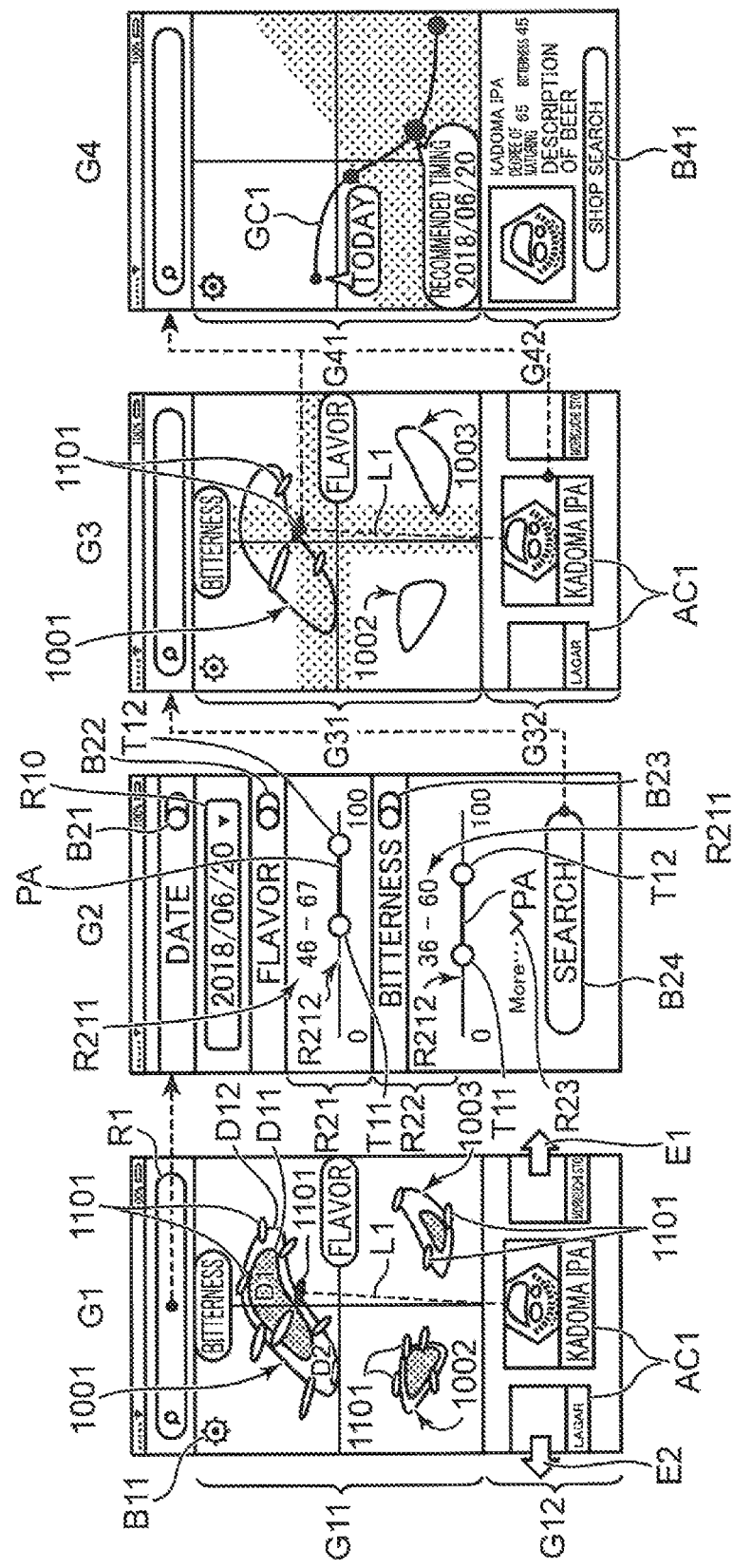
FIG. 10 is a diagram showing one example of an input screen to be displayed on a user terminal.

The acquiring unit 122 acquires instruction information indicative of a user's preferred beer taste. Here, instruction information is information input by a user by operating the input screen G1 (see FIG. 10) displayed on a display unit 24 of the user terminal 20. The input instruction information is transmitted from the user terminal 20 to the server 10 via the network NT and acquired by the acquiring unit 122. With reference to FIG. 10, there is displayed, on the input screen G1, a coordinate space image G11 having bitterness and flavor as two axes. By inputting operation for selecting a preferred taste to the coordinate space image G1, a user inputs instruction information. Accordingly, in the present disclosure, the instruction information is configured with two kinds of parameters, bitterness and flavor.

Figure 2:
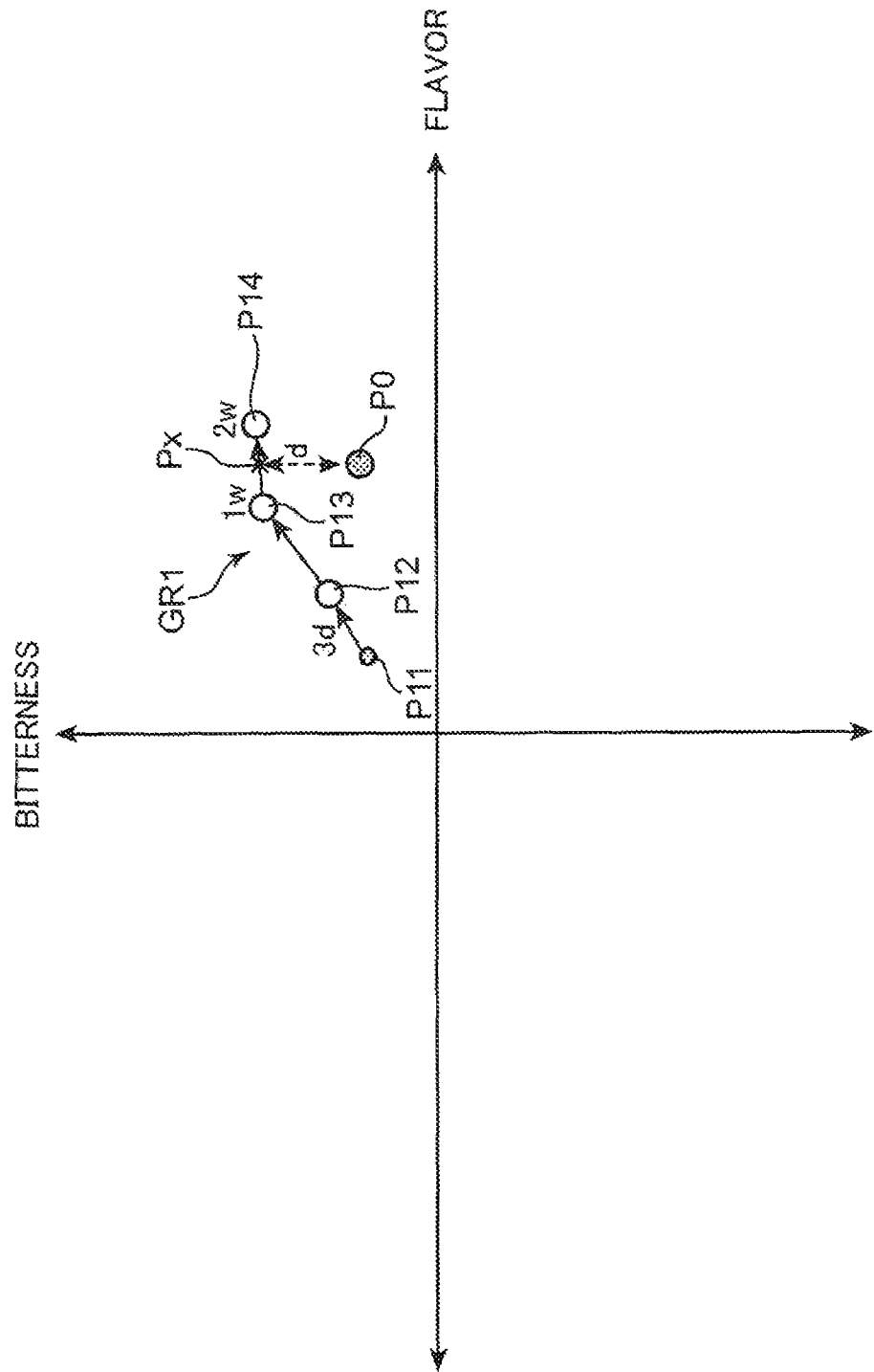
FIG. 2 is a diagram showing one example of a coordinate space having a plurality of parameters constituting a feature quantity of a taste as coordinate axes.

The feature quantity calculating unit 123 calculates a first feature quantity indicative of a feature of a taste indicated by the instruction information. In tire present embodiment, a feature quantity of a taste is configured with two kinds of parameters, bitterness and flavor as shown in FIG. 2. Accordingly, the feature quantity calculating unit 123 calculates the first feature quantity from values of the two kinds of parameters constituting the instruction information acquired by the acquiring unit 122.

FIG. 2 is a diagram showing one example of a coordinate space SP having a plurality of parameters constituting a feature quantity of a taste as coordinate axes. As shown in FIG. 2, the coordinate space SP is configured with a two-axis coordinate space having bitterness and flavor as two axes. Although two kinds of parameters, bitterness and flavor, are adopted herein as a plurality of parameters, the present disclosure is rot limited thereto, and three or more kinds of parameters or one parameter may be adopted. There is a case, for example, where a taste of beer is evaluated using an index such as sourness, moltiness, sweetness, savoriness, or hop flavor other than bitterness and flavor. Accordingly, at least one of these indexes can be adopted as a parameter.

Bitterness is represented by an IBU (International Bitterness Units) value determined based on an isoalpha component. The higher bitterness becomes, the more is increased an isoalpha component to increase an IBU value. In the present disclosure, an IBU value presented for each brand by a brewery of beer is adopted as a numerical value which defines bitterness. In general, beer demonstrates a tendency to have an isoalpha component reduced over time and thereby have reduced bitterness.

Flavor, which is an index representing a depth of a beer taste, has a value increased as the degree of maturing is increased. In a case of wine, for example, flavor corresponds to such an index as full-body and light-body. Flavor is determined on the basis of an alcohol percentage and a monosodium glutamate content in beer. The present disclosure adopts, as a numerical value for defining flavor, a numerical value calculated by performing predetermined computation with respect to an alcohol percentage and a monosodium glutamate content presented for each brand by a beer brewery. In the present disclosure, for example, a value of a flavor is determined using a function, a look-up table, or the like which determines in advance a correspondence relationship between a monosodium glutamate content and an alcohol percentage, and a value of a flavor. A beer flavor subtly changes as an alcohol percentage and a monosodium glutamate content change overtime.

Reference is returned to FIG. 1. The extracting unit 124 calculates progress information indicative of a temporal change of a second feature quantity representing a feature of a taste from the brewery DB (data base) 131 which stores a temporal change in a content of each of one or more components of one or more beers, and extracts a beer having a Euclidean distance equal to or less than a reference value, the Euclidean distance being a distance between the first feature quantity calculated by the feature quantity calculating unit 123 and the progress information.

With reference to FIG. 2, it is assumed that progress information of the second feature quantity of a certain beer is represented by a graph GR1 indicated by a broken line and instruction information input by a user is represented by a point P0. The point P0 represents the first feature quantity indicative of a user's preferred taste. In this case, the extracting unit 124 calculates a Euclidean distance d between the graph GR1 and the point P0. The extracting unit 124 also calculates a Euclidean distance d for all the other beers stored in the brewery DB 131. Then, the extracting unit 124 extracts a beer having a Euclidean distance d equal to or less than the reference value as a beer close to a user's taste preference.

In the graph GR1, a point P11 at a left end represents the second feature quantity on a shipping date and second to fourth points P12, P13, and P14 from the left end represent second feature quantities obtained three days later (3 d), one week later (1 w), and two weeks later (2 w) from the shipping date, respectively. The brewery presents representative IBU value, alcohol percentage, and monosodium glutamate content as shown by the points P11 to P14 in the graph GR1. The extracting unit 124 therefore calculates a representative second feature quantity from these representative IBU value, alcohol percentage, and monosodium glutamate content. Then, the extracting unit 124 need only connect the representative second feature quantities to calculate the graph GR1.

Reference is returned to FIG. 1. With respect to the beer extracted by the extracting unit 124, the time specifying unit 125 specifics time when the beer comes to have a taste suited to a user's preferred taste by using the Euclidean distance d.

With reference to FIG. 2, assuming that an intersection point between a straight line represented by the Euclidean distance d between the graph GR1 and the point P0, and the graph GR1 is represented as Px, the time specifying unit 125 obtains the number of days from a shipping date corresponding to the intersection point Px. Then, the time specifying unit 125 need only specify a date of shipment from a fermentation table T32 (sec FIG. 3) and specify, as the time, a date (hereinafter, described as "date fit for drinking") obtained by adding the number of days elapsed from the shipping date to the specified shipping date. The Euclidean distance d between the point P0 and the graph GR1 indicates a shortest distance between the point P0 and the graph GR1.

A beer and a date fit for drinking each beer extracted by the extracting unit 124 and the time specifying unit 125 are transmitted to the user terminal 20 as extraction results by using the communication unit 11 and displayed in the user terminal 20.

Reference is returned to FIG. 1. When acquiring a selection instruction of a beer selected by a user by operating the user terminal 20 via the network NT from the user terminal 20 from among beers extracted by the extracting unit 124, the determining unit 126 determines the selected beer as a beer to be purchased by the user. When acquiring a selection instruction, the determining unit 126 searches for a shop from which the beer can be purchased and transmits a shop list including the shop obtained by the search to the user terminal 20 by using the communication unit 11. Hereinafter, the user purchases the beer by visiting a desired shop from among the shops included in the shop list, or by ordering and having the beer sent, or the like.

Figure 3:
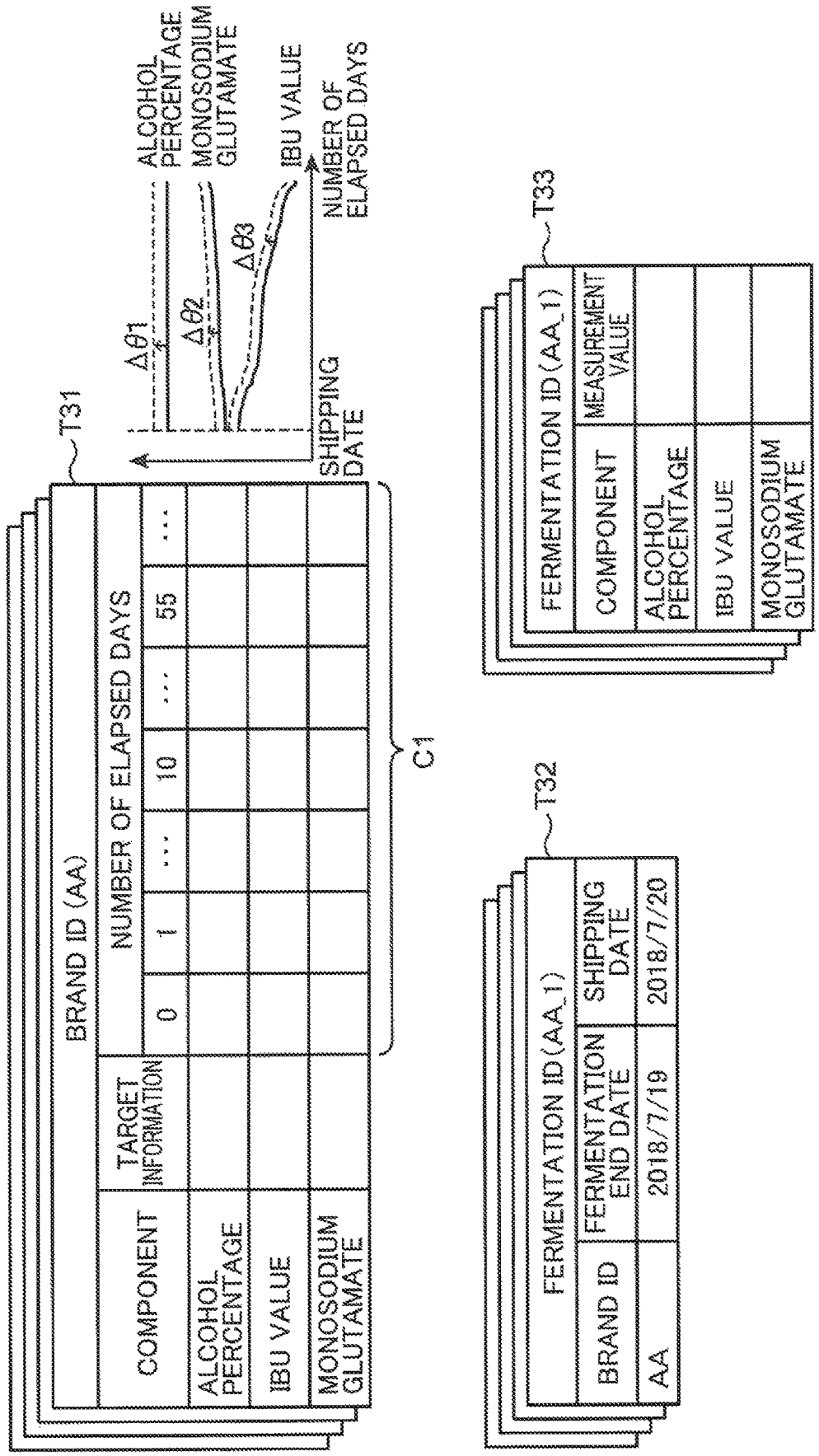
FIG. 3 is a diagram showing one example of a data configuration of a brewery DB.

The memory 13 is configured with, e.g., a semiconductor memory and stores the brewery DB (one example of a food product DB) 131 and the evaluation information DB 132. The brewery DB 131 is a data base which stores in advance a temporal change in a content of each component of one or more beers. FIG. 3 is a diagram showing one example of a data configuration of the brewery DB 131.

The brewery DB 131 is provided with a brand table T31, the fermentation table T32, and a measurement table T33. The brand table T31 is a table prepared for each brand of beer, in which "component" and "target information" are set on the vertical axis and "the number of elapsed days" is set on the horizontal axis. "Brand ID" is assigned to one brand table T31. "Brand ID" is an identifier for identifying a brand of a beer. The brand table T31 is prepared in advance on the basis of data presented from a beer brewery to the server 10.

"Component" represents a component constituting a beer. Here, "component" includes an IBU value for converting bitterness into a numerical value, an alcohol percentage, and monosodium glutamate for converting flavor into a numerical value. This is, however, one example, and when a parameter other than bitterness and flavor as a feature quantity of a beer taste is adopted, a component necessary for calculating the parameter need only be adopted. For example, an amount of hop, carbohydrate, protein, and fat may be adopted as a "component". Additionally, as a component content, not a content itself but a content per unit volume (100 ml, one barrel, or the like), for example, need only be adopted.

"Target information" represents a reference content of each component. Reference content represents a content of each component necessary for reproducing a target taste. In other words, "target information" represents a production recipe of a beer. Here, a reference content of each of an alcohol percentage, an IBU value, and monosodium glutamate is adopted as "Target information".

"The number of elapsed days" represents tire number of elapsed days with a shipping date as a reference date. In the brand table T31, a cell group C1 represented by a matrix of "the number of elapsed days" and "component" stores a temporal change in a content of each component from a shipping date.

On the right side of the brand table 131, there is displayed a graph indicative of a temporal change in a content of each component stored in the cell group C1. In this example, a content of each component is set on the vertical axis and the number of days elapsed from a shipping date is set on the horizontal axis. It is found that in this example, the alcohol percentage substantially levels off and has no temporal change. It is also found that the monosodium glutamate is slightly increased with a lapse of days. It is also found mat the IBU value is gradually decreased with a lapse of days. It is accordingly presumed that a beer of this brand has deeper flavor and has less bitterness as a day from the shipping date elapses. Thus, a beer (an unfiltered beer) as a target of the present disclosure has a taste changing with a lapse of days from the shipping date even if the beer is of the same brand.

The fermentation table T32 is a table for use in specifying a date fit for drinking beer, and has a "fermentation ID" one-to-one assigned thereto.

"Fermentation ID" is an identifier for specifying a fermentation date of a beer. Here, a plurality of fermentation IDs may be applied to a beer of one brand to prepare a plurality of fermentation tables T32. In the present embodiment, for the sake of explanation, it is assumed that in a case where a plurality of the fermentation tables T32 are present for a beer of one brand, the fermentation table T32 having the latest shipping date is referred to. Specifically, the present embodiment will be described assuming that in a case where with respect to a beer of a certain brand, there are beers having different shipping dates, a seller of the beer provides a beer having the latest shipping dale to a user.

The fermentation table T32 stores "brand ID", "fermentation end date", and "shipping date" in association with each other. "Brand ID" corresponds to the brand ID shown in the brand table T31. "Fermentation end date" indicates a fermentation end date of a beer of a relevant brand. Fermentation end dale represents a date when a fermentation step ends in a beer production process. "Shipping date" indicates a shipping date of a beer of the relevant brand and represents a date when the beer was shipped from a brewery.

The measurement table T33 (one example of component information) is a table which stores measurement information indicative of a measurement value of each component on a shipping date of a beer of a brand stored in the fermentation table T32. Specifically, the fermentation table T32 is prepared one for one measurement table T33 and stores "component" and "measurement value" in association with each other. "Fermentation ID" is allocated to each measurement table T33 so as to be associated with the fermentation table T32.

Here, similarly to the brand table T31, "alcohol percentage". "IBU value", and "monosodium glutamate" are included as "component". In other words, with respect to a beer of the relevant brand, the measurement table T33 stores a measurement value of each of "alcohol percentage", "IBU value", and "monosodium glutamate" measured on a shipping date.

FIG. 4 is a diagram showing one example of a data configuration of the evaluation information DB 132. The evaluation information DB 132, which is configured with an evaluation information table T41 prepared for each user, is a data base which stores the evaluation information indicative of evaluation of a beer drunk by a user in the past on a user basis and in time series.

The evaluation information DB 132 is a data base prepared in advance on the basis of data indicative of evaluation of a beer which is transmitted via the user terminal 20 when a user drinks the beer. One user ID ("U1" in this case) is allocated to one evaluation information table T41, In the evaluation information table T41, "brand ID" "fermentation ID", "evaluation", "comment", and "dish" are allocated on the vertical axis and "drink day" is allocated on the horizontal axis.

"Drink day" indicates date and time when a user drinks a beer, such as "2018/7/21/9:00". "Brand ID" indicates an identifier of a brand of a beer drunk by a user. "Fermentation ID" indicates an identifier for associating the fermentation table T32 shown in FIG. 3 and a beer drunk by a user. "Evaluation" indicates an evaluation value of a beer evaluated by a user. In the present disclosure, evaluation values are converted into numerical values of five stages, 1 to 5, which indicate that a higher number represents higher user's evaluation.

"Comment" indicates a user's comment on a beer. Here, character strings are adopted as "comment", such as "smooth to the throat" and "savory" related to a beer taste. "Dish" indicates a dish taken by a user together with a beer when evaluating the beer. For example, in a record in the first column, evaluation information is stored which indicates that at nine o'clock on Jul. 21, 2018, a beer with a brand ID "AA" was taken together with "fried chicken" and received evaluation of "5".

Reference is returned to FIG. 1. The user terminal 20 is provided with a communication unit 21, a processor 22, an operating unit 23, and the display unit 24. The communication unit 21 is configured with a communication circuit which connects the user terminal 20 to the network NT. The processor 22, which is configured with, e.g., a CPU, is provided with an input screen generating unit 221, an instruction accepting unit 222, a result display unit 223, and a selection accepting unit 224. The configuration of the processor 22 may be realized by executing, by the processor 22, a program which is stored in a memory (not shown) and causes a computer 10 function as the user terminal 20 of the present information presenting system, or the processor 22 may be configured with a dedicated electric circuit.

The input screen generating unit 221 generates the input screen G1 (see FIG. 10) for a user to input instruction information and displays the input screen on the display unit 24. The instruction accepting unit 222 accepts instruction information input by operating the operating unit 23 by a user who browses the input screen G1 and transmits the instruction information to the server 10 by using the communication unit 21.

The result display unit 223 receives a beet extraction result and a dote fit for drinking which are extracted by the server 10 by using the communication unit 21, which are displayed on the display unit 24. The selection accepting unit 224 accepts a selection instruction input by a user by operating the operating unit 23 from among beers extracted by the server 10 and transmits the selection instruction to the server 10 by using the communication unit 21.

The operating unit 23 is configured with an input device such as a touch panel, a keyboard, a mouse, or the like and is used for inputting various kinds of instructions by a user. The display unit 24, which is configured with a display device such as a liquid crystal display, displays the input screen G1 and the like or displays a brand and the like of a beer extracted by the server 10.

Figure 5:
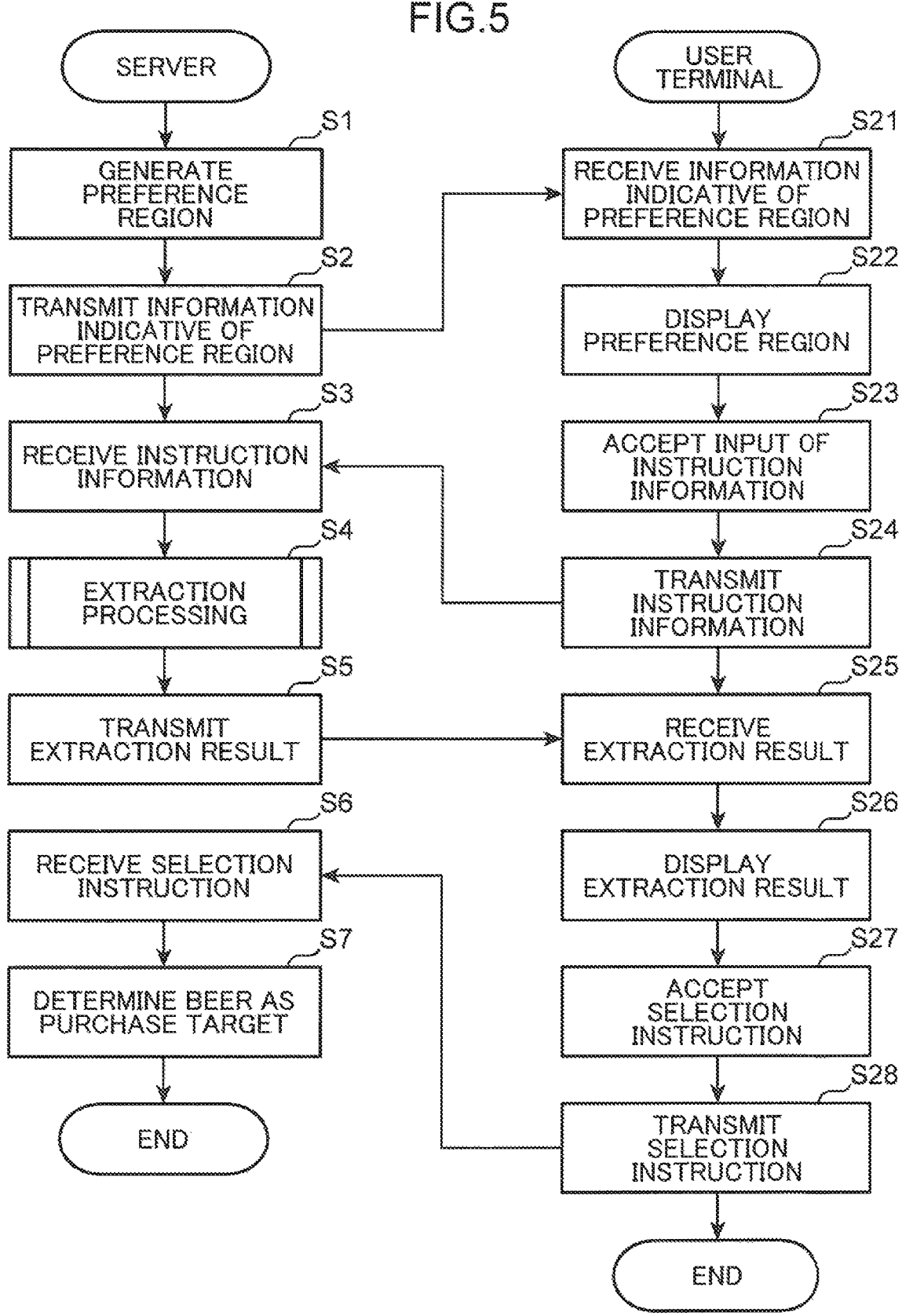
FIG. 5 is a flow chart showing one example of processing of the information presenting system illustrated in FIG. 1.

FIG. 5 is a How chart showing one example of processing of the information presenting system illustrated in FIG. 1. In S1, the preference region generating unit 121 generates a preference region by using the evaluation information table T41 stored in the evaluation information DB 132 and the measurement table T33 stored in the brewery DB 131. Details of generation of the preference region will be described in the following.

First, the preference region generating unit 121 extracts a beer having an evaluation value of 5 or above from the evaluation information table T41 (see FIG. 4) to which a user ID of a relevant user is allocated. Here, since beers of brand IDs "AA" and "AB" have the evaluation value of "5", these beers are extracted. Next, the preference region generating unit 121 specifies the measurement table T33, with fermentation IDs "AA_1" and "AB_1" corresponding to the brand IDs "AA" and "AB" as a key. Next, the preference region generating unit 121 acquires a measurement value of each component (an alcohol percentage, an IBU value, and monosodium glutamate) of both the beers from the specified measurement table T33.

Next, the preference region generating unit 121 determines a bitterness value of each of both the beers from IBU values of the respective beers, and determines a flavor value of each of both the beers from an "alcohol percentage" and a "monosodium glutamate" content of the respective beers.

Next, the preference region generating unit 121 plots, on the coordinate space SP, two points corresponding to the bitterness and flavor values of both the beers, respectively, as points indicating feature quantities of tastes of both the beers. Next, the preference region generating unit 121 sets a closed curve passing through or including the plotted two points, and generates a region surrounded by the closed curve as a preference region. In this case, since the plotted points are two, for example, an oval with the two points as foci need only be adopted as a closed curve. In a case of three or more plotted points, a closed curve need only be set by curvilinear interpolation of the three points. In a case of one plotted point, a circumference of a circle with a predetermined radius centered around the one point need only be set as a closed curve.

This makes a region D1 surrounded by a closed curve D11 as shown in the coordinate space image G11 in FIG. 10 be set as a preference region. The preference region generating unit 121 may set, outside the closed curve D11 set by the above manner, another closed curve D12 surrounding the closed curve D11, and may set, as a preference region, a region (D1+D2) obtained by adding a region D2 surrounded by the closed curve D11 and the closed curve D12 to the region D1. In this case, a preference region using foe closed curves D11 and D12 as shown in the coordinate space image G11 in FIG. 10 is generated, so that the preference region can be expressed as if contour lines are used.

In this case, the preference region generating unit 121 may set a color of the region D1 surrounded by the closed curve D11 to be darker than a color of the region D2 sandwiched by the closed curve D11 and the closed curve D12. This can express that a user's taste preference becomes stronger toward the center of the region (D1+D2).

Although in the above description, the preference region generating unit 121 extracts a beer with the evaluation value of "5" from the evaluation information table T41, the present disclosure is not limited thereto, and a beer with an evaluation value equal to or more than a predetermined value (e.g. "4" or "3") may be extracted. In this case, the preference region generating unit 121 may set, as a preference region, a region surrounded by a closed curve passing through or including the point plotted in the coordinate space SP for each evaluation value. In a case where there is no beer with the evaluation value of "5" in the evaluation information table T41, a beer having the highest evaluation value among the evaluation values stored in the evaluation information table T41 need only be extracted from the evaluation information table T41.

Further, although in the above description, the preference region generating unit 121 specifies a content of a component of a beer having the evaluation value of "5" by referring to live measurement table T33, the present disclosure is not limited thereto, and a content of a component of a beer having the evaluation value of "5" may be specified by using a reference content stored in the field of "target information" of the brand table T31. In this case, the reference content stored in the field of "target information" is one example of the component information.

Reference is returned to FIG. 5. In S2, the preference region generating unit 121 transmits information indicative of the preference region generated in S1 to the user terminal 20 by using the communication unit 11.

In S21, the communication unit 21 of the user terminal 20 receives information indicative of the preference region. In S22, the input screen generating unit 221 displays the preference region on the input screen G1 by using the information indicative of the preference region received in S21. As a result, the preference region 1001 and the like shown in FIG. 10 are displayed on the input screen G1.

In S23, the instruction accepting unit 222 of the user terminal 20 accepts input of instruction information indicative of a preferred taste from a user. In S24, the instruction accepting unit 222 of the user terminal 20 transmits the instruction information accepted in S23 to the server 10 by using the communication unit 21.

In S3, the communication unit 11 of the server 10 receives the instruction information. In S4, the processor 12 of the server 10 executes extraction processing to determine an extraction result including a beer meeting a user's preference and a date fit for drinking the beer. Details of the extraction processing will be described later with reference to FIG. 6.

In S5, the communication unit 11 of the server 10 transmits the extraction result determined in S4 to the user terminal 20. In S25, the communication unit 21 of the user terminal 20 receives the extraction result.

In S26, the result display unit 223 of the user terminal 20 displays the extraction result on the display unit 24. In S27, the selection accepting unit 224 of the user terminal 20 accepts the user's selection instruction for the beer indicated by five extraction result via the operating unit 23. In S28, the selection accepting unit 224 of the user terminal 20 transmits the selection instruction accepted in S27 to the server 10 by using the communication unit 21.

In S6, the communication unit 11 of the server 10 receives the selection instruction. In S7, the determining unit 126 of the server 10 determines the beer indicated by the selection instruction as a purchase target beer.

Figure 6:
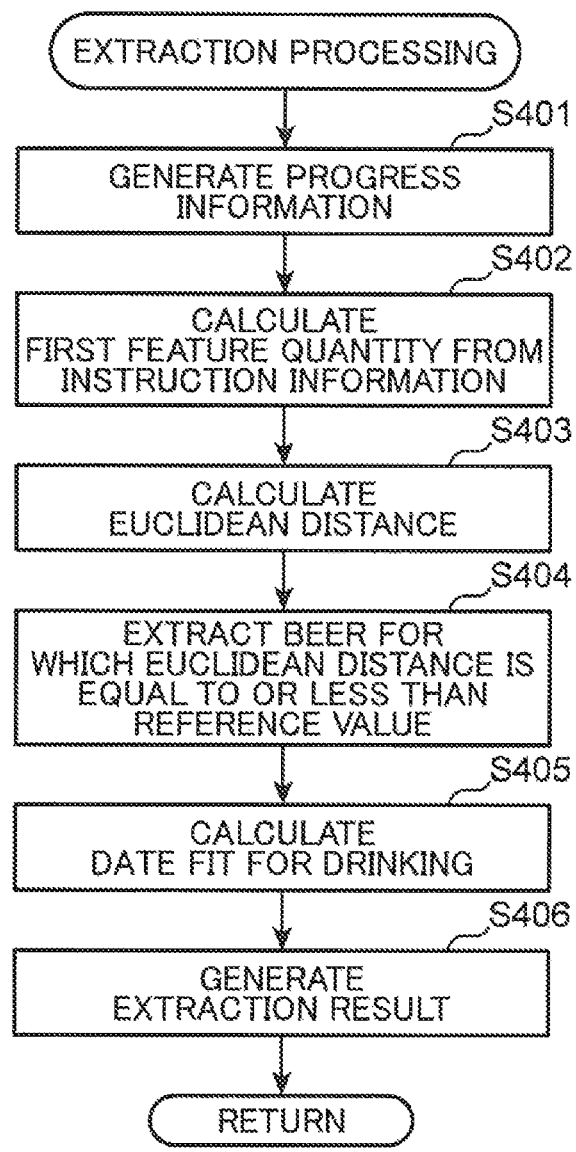
FIG. 6 is a flow chart showing details of extraction processing executed in S4 of FIG. 5.

FIG. 6 is a flow chart showing details of the extraction processing executed in S4 of FIG. 5. In S401, the extracting unit 124 of the server 10 generates progress information of each beer stored in the brewery DB 131 by using the brand table T31 (see FIG. 3).

Figure 7:
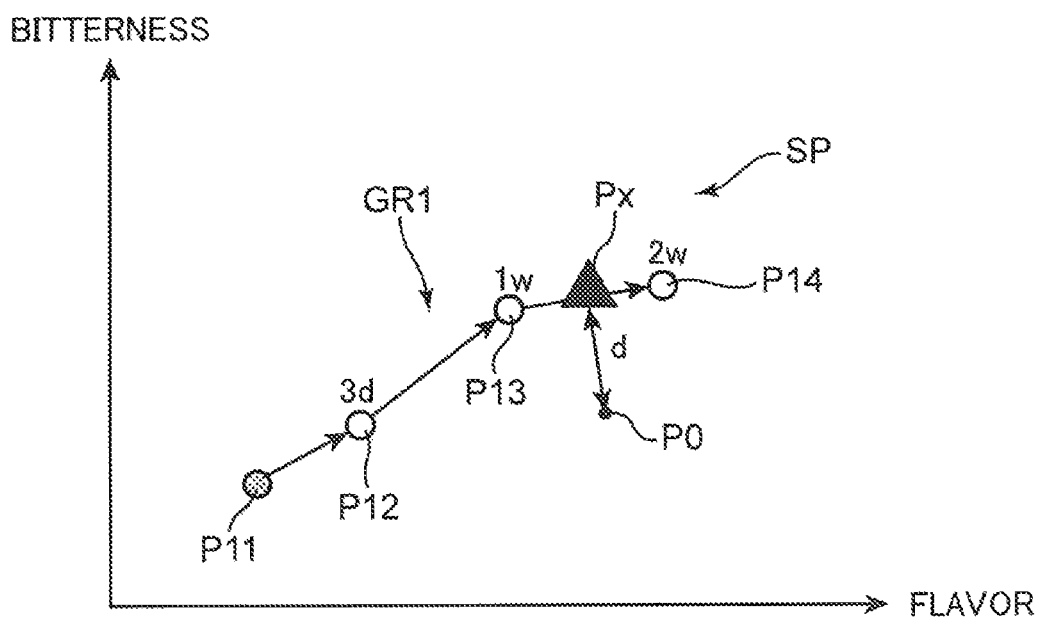
FIG. 7 is a diagram showing a first example of generation of progress information.

FIG. 7 is a diagram showing a first example of generation of progress information. The first example is a method to be applied to a beer of a brand stored in one brand table T31 (see FIG. 3) in the brewery DB 131. In this case, the extracting unit 124 calculates a bitterness value and a flavor value corresponding to each column from three contents stored in three cells in each column of the cell group C1 shown in the brand table T31 illustrated in FIG. 3 to obtain a second feature quantity corresponding to each column. Then, the extracting unit 124 plots the calculated second feature quantity on the coordinate space SP. This results in plotting the point P11, the point P12, the point P13, and the point P14 indicative of the second feature quantity on the coordinate space SP as shown in FIG. 7. The point P11 to the point P14 represent the second feature quantities of zero days, the third day, the first week, and the second week from the shipping date, respectively.

Next, the extracting unit 124 sets the graph GR1 formed of the broken lines connecting the points P11 to P14 on the coordinate space SP and plots the number of elapsed days on the graph GR1 to generate progress information. In the foregoing manner, the progress information shown in the first example is generated. Although in the example shown in FIG. 7, only four-points are plotted, as many points as the respective columns in the cell group C1 are plotted in the coordinate space SP in practice.

Figure 8:
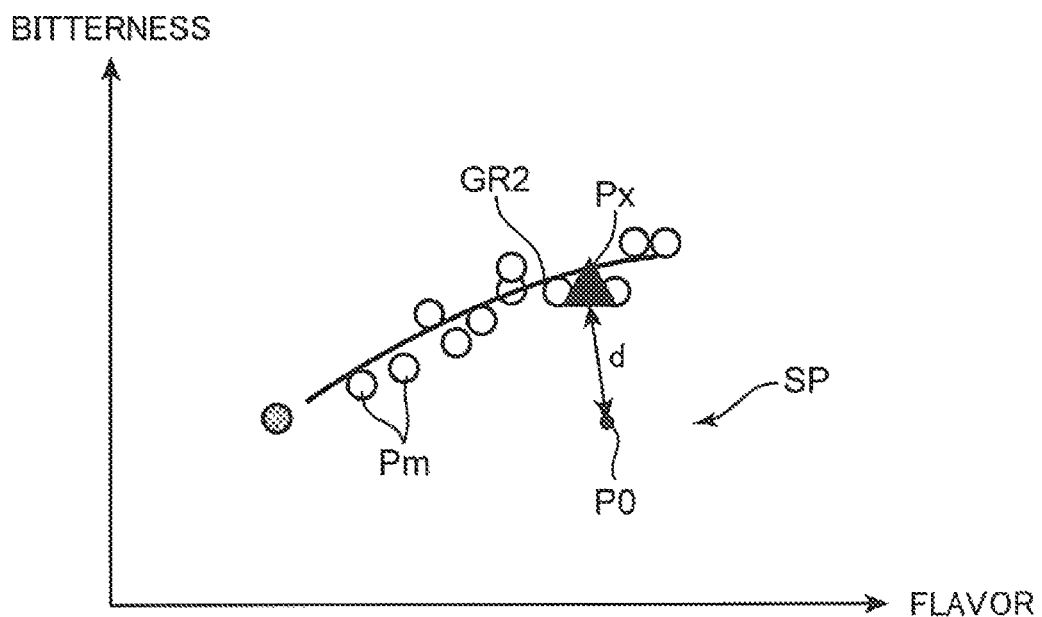
FIG. 8 is a diagram showing a second example of generation of the progress information.

FIG. 8 is a diagram showing a second example of generation of the progress information. The second example is a method to be applied to a beer of a brand stored in a plurality of the brand tables T31 (see FIG. 3) in the brewery DB 131. Here, it is assumed that there are k (k is an integer of 2 or more) brand tables T31 for a certain brand. In this case, similarly to the first example, the extracting unit 124 calculates a second feature quantity corresponding to each column in the cell group C1 shown in the brand table T31 and plots the second feature quantity in the coordinate space SP. However, since k brand tables T31 are present, points k-times those in the first example will be plotted in the coordinate space SP. Here, the plotted point is assumed as Pm. Next, the extracting unit 124 obtains a regression straight line or u regression curve of the points Pm plotted in the coordinate space SP and plots the number of elapsed days on the obtained regression straight line or regression curve to generate progress information. In the example of FIG. 8, a regression curve indicated by a graph GR2 is generated as progress information. Here, the extracting unit 124 need only classify the points Pm for each number of elapsed days, obtain an average value of bitterness or flavor at the classified point Pm, and plot the number of elapsed days corresponding to a position of the average value on the graph GR2. With respect to the first day as an example, the extracting unit 124 need only calculate an average value of bitterness or flavor at k points Pm forming the first day, and plot "the first day" as the number of elapsed days at a point having the average value on the graph GR2.

Then, the extracting unit 124 applies the processing shown in FIG. 7 or FIG. 8 to each beer of all the brands stored in the brand table T31 to generate progress information of each of all the brands.

Reference is returned to FIG. 6. In S402, the feature quantity calculating unit 123 of the server 10 calculates a first feature quantity from the instruction information received in S3. In S403, the extracting unit 124 calculates a Euclidean distance d between the first feature quantity calculated in S402 and the progress information of each of all the brands generated in S401. A method of calculating a Euclidean distance d in a case where the first example of generating progress information shown in FIG. 7 is the same as the method described with reference to FIG. 2.

Also in a case where the second example of generating progress information shown in FIG. 8 is adopted, the extracting unit 124 need only calculate a Euclidean distance d indicative of a shortest distance between the progress information and the point P0 indicative of the first feature quantity similarly to the first example.

Reference is returned to FIG. 6. In S404, the extracting unit 124 extracts a beer for which a Euclidean distance d, among the Euclidean distances d calculated in S403, is equal to or less than a reference value. Here, as a reference value, a value determined in advance can be adopted, the value being considered to be close to a preferred taste designated by instruction information by a user.

In S405, the time specifying unit 125 obtains a date fit for drinking the beer extracted in S404. In the example in FIG. 7, the intersection point Px is positioned between the point P13 for the first week from the shipping date and the point P14 for the second week from the shipping date. In this case, the time specifying unit 125 obtains a ratio of a distance between the point P13 and the intersection point Px to a distance between the point P13 and the point P14, and multiplies seven days as a difference between the first week and the second week by the ratio, thereby calculating the number of elapsed days corresponding to the intersection point Px. For example, assuming that the intersection point Px is at a middle point between the point P13 and the point P14, the number of elapsed days corresponding to the intersection point Px with the point P13 as a reference will be four days (round-up of 7×0.5=3.5), so that the number of elapsed days at the intersection point Px will be calculated to be one week+four days=11 days. Then, the time specifying unit 125 need only calculate a date fit for drinking by specifying a shipping date corresponding to the point P11 from the fermentation table T32 and adding the number of elapsed days at the intersection point Px to the shipping date. For example, assuming that the shipping date is Jul. 20, 2018, Jul. 31, 2018 as a result of addition of 11 days to the date is calculated as a date fit for drinking. The extracting unit 124 calculates a date fit for drinking for each beer of all the brands extracted in S404.

In S406, the extracting unit 124 generates, as an extraction result, information which associates the beer extracted in S404 with a date fit for drinking the beer. For example, assuming that beers with the brand ID "AA" and the brand ID "AB" are extracted and dates fit for drinking the beers are "Jul. 31, 2018" and "Jul. 30, 2018", respectively, the extraction result will include data which associates the brand ID "AA" with "Jul. 31, 2018" as a date fit for drinking and data which associates the brand ID "AB" with "Jul. 30, 2018" as a date fit for drinking. The extraction result may include information related to a beer such as a brand of a beer and a brewery in addition to the brand ID "AA". When S406 ends, the processing proceeds to S5 in FIG. 5.

Figure 9:
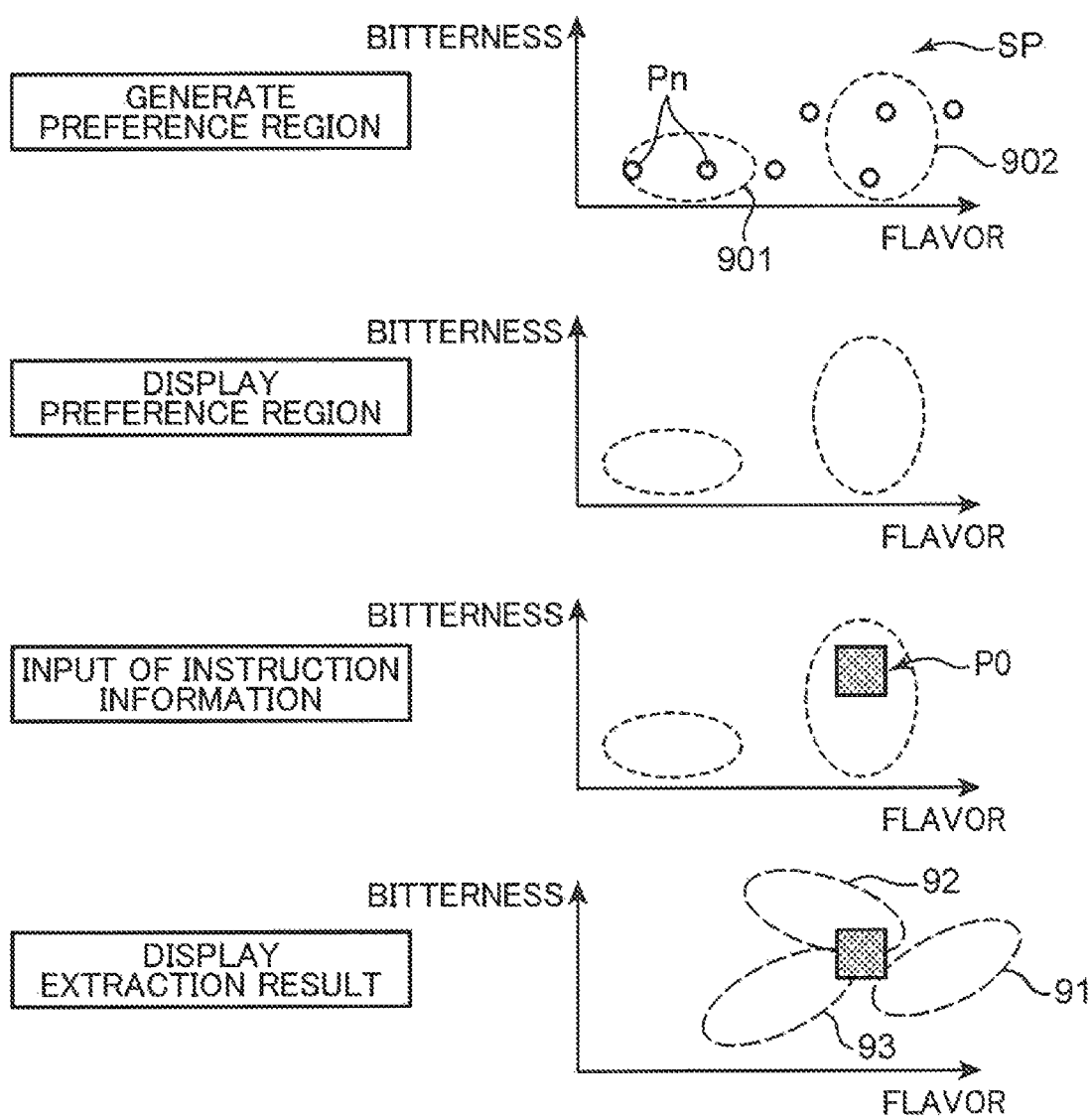
FIG. 9 is a diagram summarizing processing of the information presenting system shown in FIG. 1.

FIG. 9 is a diagram summarizing processing of the information presenting system shown in FIG. 1. First, in the first column of FIG. 9, a preference region for a user's taste is calculated from the evaluation information accumulated in the evaluation information table T41. In the example in the first column of FIG. 9, two preference regions 901 and 902 are calculated. Thus, in the present embodiment, the preference region generating unit 121 may generate a plurality of the preference regions in a case where numbers of points are plotted in the coordinate space SP.

Specifically, the preference region generating unit 121 first plots, in the coordinate space SP, a point Pn indicative of a feature quantity of a beer having an evaluation value equal to or more than a predetermined value as described with respect to S1 in FIG. 5. Next, the preference region generating unit 121 attempts clustering of the points Pn plotted by using a known clustering method such as a maximum distance method and a group distance method. Then, in a case where the plotted points Pn are divided into a plurality of clusters, the preference region generating unit 121 need rally generate, with respect to the point Pn forming each cluster, a preference region corresponding to each cluster by applying the method described with respect to S1 in FIG. 5.

In the second column of FIG. 9, the preference regions 901 and 902 are displayed in the user terminal 20. In the third column of FIG. 9, a user inputs instruction information by designating a position on the coordinate space SP indicative of a preferred taste while referring to the preference regions 901 and 902. Here, the point P0 slightly above the center is designated in the preference region 902.

In the fourth column of FIG. 9, a Euclidean distance d between the point P0 and progress information of each beer stored in the brewery DB 131 is calculated, a beer having a Euclidean distance d equal to or less than the reference value is extracted, and an extraction result is displayed in the user terminal 20. Here, three beers having progress information positioned in three regions 91, 92, and 93 are extracted and displayed in the user terminal 20.

FIG. 10 is a diagram showing one example of input screens G1 to G4 to be displayed in the user terminal 20. First, the input screen G1 is displayed in the user terminal 20. The input screen G1 is a screen to be displayed immediately after a user starts an application, on the user terminal 20, for receiving service in the present information presenting system and logs in to the server 10.

The input screen G1 is provided with the coordinate space image G11 indicative of the coordinate space SP, and a brand display section G12. The coordinate space image G11 is an image showing the coordinate space SP having bitterness set on the vertical axis and flavor set on the horizontal axis. In this case, there are displayed three preference regions 1001, 1002, and 1003 in the coordinate space image G11. These preference regions 1001 to 1003 are regions generated on the basis of the evaluation information table T41 of a user having logged in. By displaying the preference regions 1001 to 1003, a guide for inputting instruction information can be provided to a user, resulting in facilitating input of instruction information.

A plurality of regions 1101 indicated by an oval shows a distribution, on the coordinate space SP, of progress information of a beer of each brand stored in the brewery DB 131. If the region 1101 is displayed here so as to include ail the progress information, the region 1101 will be displayed to be excessively large, so that visibility might be decreased. Under these circumstances, the region 1101 may be displayed in a size including progress information of several days (e.g. three or four days) from a shipping date.

In the brand display section G12, an icon AC1 indicative of a brand of each beer stored in the brewery DB 131 is displayed. Here, the icon AC1 displayed at the center of the brand display section G12 is displayed so as to be associated with the region 1101 by a line L1. At this time, the region 1101 corresponding to the icon AC1 displayed at the center is displayed in a color darker than the other pan of the region 1101. This enables a user to recognize a taste distribution, on the coordinate space SP, of a beer of a brand indicated by the icon AC1 with ease.

When operation to slide the brand display section G12 in a right direction E1 is input, the input screen generating unit 221 scrolls the brand display section G12 in the right direction so as to be displayed. On the other hand, when operation to slide the brand display section G12 in a left direction E2 is input, the input screen generating unit 221 scrolls the brand display section G12 in the left direction so as to be displayed. This results in displaying the icon AC1 of other brand in the brand display section G12. In this case, the icon AC1 of other brand displayed at the center of the brand display section G12 is also displayed so as to be associated with the region 1101 by the line L1. This enables a user to recognize a taste distribution, on the coordinate space SP, of a beer of other brand with ease.

When operation (e.g. tapping or click) to select an input section R1 or an edit button B11 on the input screen G1 is input, the instruction accepting unit 222 causes the display unit 24 to display an input screen G2.

The input screen G2 is a screen for a user to input instruction information indicative of a preferred taste. The input screen G2 is provided with a date designation section R10, a flavor input section R21, a bitterness input section R22, and a search button B24 indicated as "search".

The date designation section R10 is a section for a user to input a desired date on which the user desires to consume a beer. A method of extracting a beer in a case where a date is input to the date designation section R10 will be described in a third embodiment and description thereof is not made here. In a case of not desiring to input date, the user need only turn off a toggle switch B21.

The flavor input section R21 is a section for a user to input a value of a preferred taste. The flavor input section R21 is provided with a laterally long slide bar PA. The slide bar PA is provided with a slide button T11 for inputting a lower limit value of a range of flavor, and a slide button T12 for inputting an upper limit value of the range of flavor.

The slide button T11 and the slide button T12 are configured to be slidable on a gauge R212 to which values of 0 to 100 showing a range within which flavor can be designated are allocated. The user inputs a lower limit value of a preferred taste value by sliding the slide button T11 on the gauge R212 so as to be appropriately positioned. The user also inputs an upper limit value of the preferred taste value by sliding the slide button T12 on the gauge R212 so as to be appropriately positioned. Accordingly, a width between the slide button T11 and the slide button T12 becomes a range of flavor. The width is displayed in a line thicker than the gauge R212. This enables the user to recognize the range of the flavor input by the user himself/herself from the width with ease.

On the upper side of the slide bar PA, a numerical value display section R211 showing a range of flavor is provided. The numerical value display section R211 displays a lower limit value of a flavor value input by a user by sliding the slide button T11, and an upper limit value of the flavor value input by the user by sliding the slide button T12.

When the slide button T11 is slid, the lower limit value of the numerical value display section R211 changes in association with the slide. Also, when the slide button T12 is slid, the upper limit value of the numerical value display section R211 changes in association with the slide. In this case, the slide button T11 is positioned at the flavor value "46" and the slide button T12 is positioned at the flavor value "67". Therefore, "46 to 67" is displayed on the numerical value display section R211. This enables the user to recognize the range of the preferred task input by the user himself/herself through numerical values with more ease.

The bitterness input section R22 is provided with the slide bar PA and the numerical value display section R211 similarly to the flavor input section R21. The user inputs a range of bitterness by sliding live slide button T11 and the slide button T12. In this case, "36 to 60" is input as a range of bitterness.

In this manner, the user inputs the instruction information by inputting a range of flavor and a range of bitterness to the flavor input section R21 and the bitterness input section R22, respectively.

The user is also allowed to omit inputting either flavor or bitterness. In a case of omitting input of flavor, a user need only turn off a toggle switch B22. In a case of omitting input of bitterness, the user need only turn off a toggle switch B23.

The search button B24 is a button selected when a user searches for a beer with a user's preferred taste. When the search button B24 is selected, the instruction accepting unit 222 transmits instruction information input by the user to lire server 10. Additionally, when the search button B24 is selected, the result display unit 223 displays an input screen G3 in the display unit 24.

The input screen G3 is a screen which displays an extraction result of the server 10. The input screen G3 is provided with a coordinate space image G31 and a brand display section G32.

The coordinate space image G31 is an image showing the coordinate space SP similarly to the coordinate space image G11. While the coordinate space image G11 of the input screen G1 shows the regions 1101 of beers of all brands stored in the brewery DB 131, the coordinate space image G31 of the input screen G3 shows only the region 1101 of a beer of a brand included in an extraction result transmitted from the server 10. Here, since four beers are extracted, the four regions 1101 are displayed. The coordinate space image G31 also shows a vertically long band indicative of a range of flavor and a laterally long band indicative of a range of bitterness input on the input screen G2. Accordingly, a square region, in which the vertically long band and the laterally long band cross with each other, indicates a range of a preferred taste input by a user.

In this case, it is only necessary in the server 10 that the feature quantity calculating unit 123 sets the center point of the square region in which the bands cross as the first feature quantity, and the extracting unit 124 extracts a beer having a Euclidean distance d from the center point equal to or less than the reference value.

Additionally, in a case where input of flavor is omitted, it is only necessary in the server 10 that the feature quantity calculating unit 123 sets a lateral line passing the center of the laterally long band indicative of a range of bitterness as the first feature quantity, and the extracting unit 124 extracts a beer having a Euclidean distance d from the set lateral line equal to or less than the reference value.

Additionally, in a case where input of bitterness is omitted, it is only necessary in the server 10 that the feature quantity calculating unit 123 sets a vertical line passing the center of the vertically long band indicative of a range of flavor as the first feature quantity, and the extracting unit 124 extracts a beer having a Euclidean distance d from the set vertical line equal to or less than the reference value.

When operation to slide the brand display section G32 is input, the selection accepting unit 224 causes the icon AC1 of a beer of another brand to be displayed from among the beers of brands included in the extraction result. This enables a user to check the extracted beers of all the brands.

The icon AC1 displayed at the center of the brand display section G32 is displayed so as to be associated with the region 1101 by the line L1. This enables the user to check the region 1101 in which taste is distributed with respect to all the extracted beers. Additionally, since the coordinate space image G31 shows a range of a preferred taste input by a user, the user is allowed to select a beer to be purchased while comparing the range of the preferred taste with the region 1101.

When operation to select the input section R1 or the edit button B11 is input by a user who wants to conduct search again after the input screen G3 is displayed, the instruction accepting unit 222 need only cause the display unit 24 to display the input screen G2.

When operation (e.g. tapping or click) to select the region 1101 on the input screen G3 is input, the result display unit 223 causes the display unit 24 to display an input screen G4. On the input screen G4, a coordinate space image G41 is displayed in which the coordinate space image G31 is expanded centered around the selected region 1101.

In the coordinate space image G41, a graph GC1 is displayed which indicates progress information included in the selected region 1101. Black points in the graph GC1 indicate dates. In this case, the second feature quantity is displayed in association with a date in such a manner that the first point from the left indicates the second feature quantity of today and the second point indicates the second feature quantity of the next day. Further, since the third point from the left indicates a date fit for drinking, the point is displayed in a size larger than the other points and has a markup balloon M1 displayed nearby. In the markup balloon M1, a message "recommended timing 2018/06/20" is displayed. This enables a user to recognize with case that a date fit for drinking the relevant beer is Jun. 20, 2018, two days after today.

On the input screen G4, a brand display section G42 indicative of detailed information of a beer corresponding to the selected region 1101 is displayed. Here, in the brand display section G42, there are displayed a brand "Kadoma IPA", a flavor value of "65" and a bitterness value of "45" as the second feature quantity, and description for the beer of the brand. Further in the brand display section G42, a shop search button B41 is displayed. The shop search button B41 is a button to be selected by a user when purchasing the relevant beer.

When operation to select the shop search button B41 is input by a user, the selection accepting unit 224 transmits a selection instruction to the server 10 and causes the display unit 24 to display a shop list (not shown) for purchasing a relevant beer transmitted from the server 10. When the user selects a preferred shop from the shops listed in the shop list, a web site of the shop is displayed in the display unit 24. Then, the user purchases the beer by actually visiting the shop or ordering and having the beer sent, or the like. The shop list may include a restaurant which offers the relevant beer.

As described in the foregoing, in the information presenting system according to the first embodiment, a food product having a Euclidean distance d equal to or less than a reference value is extracted, the Euclidean distance d being a distance between a first feature quantity indicative of a feature of a user's preferred taste and progress information indicative of a temporal change in a second feature quantity indicating a feature of a taste of each beer stored in the brewery DB 131, and the extracted food product is presented to the user. The present configuration therefore enables a beer with a user's preferred taste to be presented in consideration of a temporal change in a taste of the beer.

Second Embodiment

The information presenting system according to a second embodiment relates to extracting a beer meeting a user's preference by causing the user to input a user's preferred number of maturing days and further taking the number of maturing days into consideration. The number of maturing days represents the number of days elapsed from a shipping date. Since an unfiltered beer has the degree of maturing advancing as the day elapses from the shipping date, the number of elapsed days from the shipping date is referred to as the number of maturing days in the present embodiment.

In the present embodiment, the same components as those of the first embodiment will be given the same reference signs to omit description thereof. Additionally, since in the present embodiment, the information presenting system has the same configuration as that of the first embodiment, FIG. 1 will be used for description. Also in the present embodiment, since the information presenting system has the same main routine as that of the first embodiment, FIG. 5 will be used for description. It is, however, assumed that in FIG. 5, the instruction information transmitted in S24 includes the number of maturing days input by the user.

When operation to select the other display section R23 indicated as "More" on the input screen G2 is input by a user, the instruction accepting unit 222 displays a number of maturing days input section (not shown) on the input screen G2. When a desired number of maturing days is input to the number of maturing days input section by the user, the instruction accepting unit 222 transmits the number of maturing days as included in the instruction information to the server 10.

FIG. 11 is a flow chart showing details of extraction processing executed in the second embodiment. In the flow of FIG. 11, the same processing as that in FIG. 6 is given the same step number.

In S1101 subsequent to S402, the extracting unit 124 extracts a second feature quantity corresponding to the number of maturing days. With reference to FIG. 7, assuming, for example, that "three days" is input as the number of maturing days, the extracting unit 124 extracts a second feature quantity associated with "three days" from the graph GR1 indicative of the progress information. Then, the extracting unit 124 calculates a Euclidean distance d between the point P12 indicative of the extracted second feature quantity and the point P0 indicative of the first feature quantity.

Also with respect to all the beers stored in the brewery DB 131, the extracting unit 124 similarly extracts a second feature quantity as of the third day from the shipping date and calculates a Euclidean distance d between a point indicative of the extracted second feature quantity and the point P0. Then, the extracting unit 124 extracts a beer having a Euclidean distance d equal to or less than a reference value as a beer meeting a user's preference and transmits the extraction result to the user terminal 20.

As described in the foregoing, the second embodiment enables a beer with a user's preferred taste to be presented to the user at a time point of an elapse of a user's desired number of maturing days.

Third Embodiment

A third embodiment relates to causing a user to input a desired date for drinking a beer and extracting a beer having a user's preferred taste in consideration of the desired date. The desired date is a date when a user desires to consume a beer, such as "Jun. 20, 2018".

In the present embodiment, the same components as those of the first and second embodiments will be given the same reference signs to omit description thereof. Additionally, in the present embodiment, an information presenting system is assumed to use the same configuration and main routine as those shown in FIG. 1 and FIG. 5. It is, however, assumed that in FIG. 5, the instruction information transmitted in S24 includes a user's desired maturing date input by the user.

On the input screen G2, when a user inputs a desired date to the date designation section R10, the instruction accepting unit 222 transmits the desired date as included in the instruction information to the server 10. FIG. 12 is a flow chart showing details of extraction processing executed in the third embodiment. In the flow of FIG. 12, the same processing as that in FIG. 6 is given the same step number.

In S1201 subsequent to S402, the extracting unit 124 extracts a second feature quantity corresponding to a desired date. With reference to FIG. 7, it is assumed that as a desired date, for example, "Jun. 20, 2018" is input. In this case, the extracting unit 124 specifies the number of elapsed days from a shipping date corresponding to a desired date. Specifically, the extracting unit 124 specifies a shipping date from the fermentation table T32 and calculates a difference in days between the shipping date and the desired date as the number of elapsed days. For example, assuming that a shipping date is "Jun. 17, 2018", three days is calculated as the number of elapsed days. Then, the extracting unit 124 extracts a second feature quantity associated with the number of elapsed days, "three days", from the graph GR1 indicative of progress information, and calculates a Euclidean distance d between the point P12 indicative of tire second feature quantity and the point P0 indicative of the first feature quantity.

Also with respect to all the beers stored in the brewery DB 131, the extracting unit 124 similarly calculates a Euclidean distance d between a point indicative of the second feature quantity and the point P0 from a difference in days between the desired date and the shipping date. Then, the extracting unit 124 extracts a beer having a Euclidean distance d equal to or less than a reference value as a beer meeting a user's preference and transmits the extraction result to the user terminal 20.

As described in the foregoing, the third embodiment enables a beer with a user's preferred taste to be presented to the user on a desired date when the user desires to consume the beer.

Fourth Embodiment

The fourth embodiment relates to correcting progress information so as to indicate a second feature quantity of a beer actually shipped from a difference between a reference content of each component stored in the field of "target information" of the brand table T31 and a measurement value of each component stored in the measurement table T33.

In the present embodiment, the same components as those of the first to third embodiments will be given the same reference signs to omit description thereof. Additionally, since in the present embodiment, the information presenting system has the same configuration as that of the first embodiment, FIG. 1 will be used for description.

In the present embodiment, the extracting unit 124 corrects the progress information in the following manner. First, the extracting unit 124 acquires a reference content of each of an alcohol percentage, an IBU value, and monosodium glutamate from "target information" in the brand table T31 for a target beer.

Next, the extracting unit 124 specifies a "fermentation ID" of the target beer with reference to the fermentation table T32 with a "brand ID" at a key, and specifies the measurement table T33 for the target beer with the specified "fermentation ID" as a key. Next, the extracting unit 124 acquires a measurement value of each of an alcohol percentage, an IBU value, and monosodium glutamate from the specified measurement table T33.

Next, the extracting unit 124 calculates a difference by subtracting, from the measurement value of each of the alcohol percentage, the IBU value, and the monosodium glutamate, a reference content of each of the alcohol percentage, the IBU value, and the monosodium glutamate acquired from the brand table T31. Here, the respective differences of the alcohol percentage, the IBU value, and the monosodium glutamate are set to be $\Delta\theta1$, $\Delta\theta2$, and $\Delta\theta3$, respectively.

Next, the extracting unit 124 adds $\Delta\theta1$, $\Delta\theta2$, and $\Delta\theta3$ to the respective contents of the alcohol percentage, the IBU value, and the monosodium glutamate stored in the cell group C1. This results in offsetting the graphs showing temporal changes of the alcohol percentage, the IBU value, and the monosodium glutamate stored in the cell group C1 by $\Delta\theta1$, $\Delta\theta2$, and $\Delta\theta3$, respectively, in a direction of the vertical axis as shown by the graph on the right side of the brand table T31 illustrated in FIG. 3.

Next, the extracting unit 124 calculates a flavor value and a bitterness value by using the respective contents having added the $\Delta\theta1$, $\Delta\theta2$, and $\Delta\theta3$ stored in the cell group C1 to generate progress information indicative of a temporal change in the second feature quantity.

Although in the production step, a reference content of each component is determined with reference to target information to produce a beer, there occurs a case where the component is not contained as indicated by the target information for some factor when the content of each component is measured after production. Additionally, some brewery may not mix components simply according to a content of each component indicated by target information but may adjust a content of each component according to environmental factors such as season, temperature, and humidity and quality factors such as qualities of hop and barley as raw materials.

Additionally, in each cell constituting the cell group C1 of the brand table T31, there is stored a content of each component corresponding to a beer produced according to a reference content indicated by the target information. In other words, a representative value of a content is stored in each cell constituting the cell group C1. Here, as a representative value, for example, a prediction value which is predicted using computer simulation may be adopted or measurement values of the respective components of a beer produced according to the reference content and an average value of the measurement values may be adopted. Therefore, the content stored in the cell group C1 does not always coincide with a content of a beer actually shipped.

Under these circumstances, in the present embodiment, progress information is corrected so as to indicate a temporal change in a second feature quantity of a shipped beer. This enables the progress information to be corrected taking into consideration a deviation, from the production recipe, in a measurement amount of each component of an actually produced beer. Then, since a beer meeting a user's preference is extracted using the corrected progress information, a beer meeting a user's preference can be more accurately extracted.

Modification (1) While the above embodiments have been described on the premise that a user is caused to input instruction information, the present disclosure is not limited thereto, and input of instruction information may be omitted. In this case, the user need only turn off both the toggle switches B22 and B23 on the input screen G2. Also in this case, the feature quantity calculating unit 123 need only set, as a first feature quantity, a center point of a preference region generated from the evaluation information table T41. Then, the extracting unit 124 need only extract a beer having a Euclidean distance d from the center point equal to or less than a reference value. In a case where the plurality of preference regions 1001, 1002, and 1003 is generated as shown in FIG. 10, the feature quantity calculating unit 123 need only set center points of the preference regions 1001, 1002, and 1003 as the first feature quantity. Then, the extracting unit 124 need only extract, as a beer meeting a user's preference, a beer having a Euclidean distance d equal to or less than the reference value, the Euclidean distance d being a distance from any of these center points.

(2) When a user selects the search button B24 on the input screen G2 in FIG. 10 and asks for search for a beer, order information about to which order of beers the target beer corresponds may be input, the order of beers being order at which the user wants to drink the beer. A possible case is, for example, where a search request is input when drinking a third beer in this meal. In this case, an input section for the order information is provided on the input screen G2, and the user is caused to input "3" as the order information in the input section. The input order information is transmitted us included in the instruction information to the server 10. In this case, the user does not input flavor and bitterness.

Then, in the server 10, the feature quantity calculating unit 123 extracts, from the evaluation information table T41, a beer having a predetermined value (e.g. "5") as an evaluation value in the order indicated by the order information. Here, the feature quantity calculating unit 123 divides the evaluation information table T41 into groups on a meal basis for a date and time stored in the field of "drink day" in the evaluation information table T41. The feature quantity calculating unit 123 need only group columns in which date and time stored in the drink day is within a fixed time period as one block. Next, assuming that for example, "3" is input as order information, the feature quantity calculating unit 123 specifies a beer drunk thirdly in each group. Next, the feature quantity calculating unit 123 extracts a beer having an evaluation value equal to or more than a predetermined value from among thirdly drunken beers, specifies bitterness and flavor values of the extracted beer from component information of live beer, and generates a preference region of the user. Then, the feature quantity calculating unit 123 sets a center point of the generated preference region as the first feature quantity. Then, the extracting unit 124 need only extract a beer having a Euclidean distance d from the first feature quantity being equal to or less than the reference value as a beer appropriate for a user to drink thirdly and present the extracted beer to the user terminal 20.

(3) When a user selects the search button B24 on the input screen G2 in FIG. 10 and asks for search for a beer, a dish that the user is currently having may be input to the input screen G2. In this case, an input section for inputting a dish may be provided on the input screen G2. Assuming that, for example, "fried chicken" is input to the input section, the information is transmitted as included in the instruction information to the server 10. In this case, the user docs not input flavor and bitterness.

Then, the feature quantity calculating unit 123 of the server 10 extracts a column in which "fried chicken" is stored as "dish" from the evaluation information table T41, and extracts a beer having an evaluation value equal to or more than the predetermined value from among beers corresponding to the extracted column. Then, the feature quantity calculating unit 123 specifies flavor and bitterness values of the extracted beer from component information of the beer to generate a preference region of the user. Hereinafter, a beer meeting a user's preference is extracted similarly to the above modification (2) and is presented to the user. The present modification enables a beer to be presented to a user, the beer being matched with a dish that a user is currently having or a dish that a user is going to have.

(4) When generating a shop list, the determining unit 126 may extract a shop in consideration of, in addition to a shop at which a relevant beer can be purchased, a position of the shop from a user. In this case, the determining unit 126 specifies a user's current position by acquiring a detection value of a GPS sensor of the user terminal 20. Then, the determining unit 126 need only extract a shop within a predetermined distance range from the user's current position and include the extracted shop in the shop list.

(5) The present information presenting system may be used for preparing a menu in a restaurant. In this case, a staff of the restaurant inputs brands of beers handled by a shop by using the user terminal 20 and transmits the brands of the beers to the server 10. Then, the processor 12 of the server 10 extracts a beer of a brand stored in the brewery DB among the input brands of beers and refers to the brand table T31 with respect to the extracted beer to calculate a feature quantity of a today's taste. Then, the processor 12 transmits, to the user terminal 20, a beer list in which the input brand of the beer and the feature quantity of the today's taste are associated with each other.

The user terminal 20 having received the beer list prepares a menu indicative of a feature quantity from the beer list, and upon accepting a printing instruction, prints out the prepared menu. This enables a restaurant to obtain a menu indicating a today's taste for each beer. Here, the prepared menu includes the coordinate space image G11 on which a feature quantity of a today's taste of each beer is plotted as shown, for example, in the input screen G1 illustrated in FIG. 10.

(6) A plurality of the brand tables T31 shown in FIG. 3 may be prepared for one brand of a beer on, for example, a season basis. In this case, the extracting unit 124 need only calculate progress information by using the brand table T31 corresponding to a current season.

INDUSTRIAL APPLICABILITY

Since the present disclosure enables a food product meeting a user's preference to be presented in consideration of a temporal change in a taste of the food product, the present disclosure is useful in service for presenting to the user a food product meeting a user's preference.

The invention claimed is:

1. An information presenting method in an information presenting system which presents a food product meeting a user's preference, the method comprising:

by a computer of the information presenting system, inputting into the information presenting system a first numerical value representing the amount of a first component of the food product having an effect on the taste of the food product that is preferred by the user, and a second numerical value representing the amount of a second component of the food product having an effect on the taste of the food product that is preferred by the user; calculating a first feature quantity indicative of the user's preferred taste for the food product based on the inputted values;

calculating, from a food product data base which stores a temporal change in a content of each of one or more components for each of one or more food products, progress information indicative of a temporal change in a second feature quantity indicative of a feature of the taste of each of the food products, and extracting a food product for which a Euclidean distance between the first feature quantity and the progress information is equal to or less than a reference value; and presenting the extracted food product, wherein the food product data base stores a temporal change in a representative value of a content of each of the first and second components for each of the food products and stores a reference content of each of the first and second components for each of the food products, the information presenting method further comprising:

referring to measurement information which associates, with respect to each of the food products, the shipping date with a measurement value of each of the components on the shipping date, correcting, with respect to each of the food products, a content stored in the food product data base on a basis of a difference between the reference content and the measurement value, and calculating the progress information using the corrected content.

2. The information presenting method according to claim 1, further comprising specifying a time when the extracted food product comes to have a taste suited to the preferred taste of the user using the distance, wherein the presentation further includes presenting the specified time.

3. The information presenting method according to claim 2, wherein the time represents a time on a basis of a shipping date of the food product.

4. The information presenting method according to claim 1, further comprising acquiring instruction information indicative of the user's preferred taste with respect to the food product, wherein the instruction information includes a number of maturing days elapsed after the shipping date of the food product, and the extraction includes specifying the second feature quantity corresponding to the number of maturing days from the progress information, and extracting a food product for which a distance between the specified second feature quantity and the first feature quantity is equal to or less than the reference value.

5. The information presenting method according to claim 1, further comprising acquiring instruction information indicative of the user's preferred taste with respect to the food product, wherein the instruction information includes a desired consumption date of the food product, and the extraction further includes specifying the second feature quantity corresponding to the desired consumption date from the progress information, and extracting a food product for which a distance between the specified second feature quantity and the first feature quantity is equal to or less than the reference value.

6. The information presenting method according to claim 1, further comprising:

displaying an input screen of the instruction information on an information terminal of the user, wherein the input screen includes a coordinate space image indicative of coordinate spaces in a plurality of dimensions for inputting a plurality of parameters constituting the first feature quantity.

7. The information presenting method according to claim 6, further comprising:

acquiring, from a memory, evaluation information which associates the food product consumed by the user in past with an evaluation value indicative of evaluation of the food product, and component information indicative of the first and second components for the food product; and calculating a preference region indicative of a region, on the coordinate space, indicative of a taste preference of the user from the acquired evaluation information and the component information, and displaying the calculated preference region in the coordinate space image.

8. The information presenting method according to claim 6, wherein the input screen displays a brand of the presented food product and a position, in the coordinate space, of one of the feature quantities indicative of the user's preferred taste of the presented food product so as to be associated with each other.

9. The information presenting method according to claim 1, further comprising acquiring instruction information indicative of the user's preferred taste with respect to the food product, wherein the instruction information is calculated from evaluation information, which associates the food product consumed by the user in past with an evaluation value indicative of evaluation of the food product, and component information indicative of a content of each of the first and second components for the food product, and the instruction information is configured with a preference region displayed on a coordinate space having a plurality of parameters constituting the first feature quantity as coordinate axes.

10. The information presenting method according to claim 1, wherein the food product is an unfiltered beer.

11. The information presenting method according to claim 10, wherein the first feature quantity and the second feature quantity each include at least a first parameter indicative of bitterness and a second parameter indicative of flavor.

12. The information presenting method according to claim 1, wherein the food product is a fermented food product or an alcoholic drink.

13. An information presenting system which presents a food product meeting a user's preference, comprising: a processor;

an inputting unit configured to input into the information presenting system a first numerical value representing the amount of a first component of the food product having an effect on the taste of the food product that is preferred by the user, and a second numerical value representing the amount of a second component of the food product having an effect on the taste of the food product that is preferred by the user; the processor calculating a first feature quantity indicative of the user's preferred taste for the food product based on the first and second inputted values;

a memory which stores a food product data base that stores a temporal change in a content of each of the first and second components for each of one or more food products;

the processor calculating, from the food product data base, progress information indicative of a temporal change in a second feature quantity indicative of a feature of the taste of each of the food products, and extracting a food product for which a Euclidean distance between the first feature quantity and the progress information is equal to or less than a reference value; and a presenting unit which presents the extracted food product, wherein the food product data base stores a temporal change in a representative value of a content of each of the first and second components for each of the food products and stores a reference content of each of the first and second components for each of the food products, and wherein the processor refers to measurement information which associates, with respect to each of the food products, the shipping date with a measurement value of each of the components on the shipping date, correcting, with respect to each of the food products, a content stored in the food product data base on a basis of a difference between the reference content and the measurement value, and calculating the progress information using the corrected content.

14. A non-transitory computer-readable recording medium that records an information presenting program which causes a computer to function as an information presenting system that presents a food product meeting a user's preference, the computer functioning as:

an inputting unit configured to input into the information presenting system a first numerical value representing the amount of a first component of the food product having an effect on the taste of the food product that is preferred by the user, and a second numerical value representing the amount of a second component of the food product having an effect on the taste of the food product that is preferred by the user;

a feature quantity calculating unit which calculates a first feature quantity indicative of the user's preferred taste for the food product based on the first and second inputted values;

a food product data base which stores a temporal change in a content of each of the first and second components for each of one or more food products;

an extracting unit which calculates, from the food product data base, progress information indicative of a temporal change in a second feature quantity indicative of a feature of the taste of each of the food products, and extracts a food product for which a Euclidean distance between the first feature quantity and the progress information is equal to or less than a value; and a presenting unit which presents the extracted food product, wherein the food product data base stores a temporal change in a representative value of a content of each of the first and second components for each of the food products and stores a reference content of each of the first and second components for each of the food products, and wherein the computer also functions to refer to measurement information which associates, with respect to each of the food products, the shipping date with a measurement value of each of the components on the shipping date, correct, with respect to each of the food products, a content stored in the food product data base on a basis of a difference between the reference content and the measurement value, and calculate the progress information using the corrected content.

15. The information presenting method according to claim 1, wherein the inputting into the information presenting system further includes performing inputting into the information presenting system by selecting a point on an x-y graph, one axis of which represents values of the amount of the first component of the food product, and the other axis of which represents values of the amount of the second component of the food product, wherein the selecting of the point on the graph inputs the first and second numerical values.

16. The information presenting method according to claim 1, wherein the inputting of the first and second numerical values comprises acquiring instruction information indicative of a preferred taste of the user with respect to the food product by inputting a point on an x-y graph, one axis of which represents values of the amount of the first component of the food product, and the other axis of which represents values of the amount of the second component of the food product, wherein the calculating of the first feature quantity comprises calculating the first feature quantity indicative of a feature of the preferred taste of the user indicated by the instruction information as the point on the x-y graph, one axis of which represents values of the amount of the first component of the food product, and the other axis of which represents values of the amount of the second component of the food product, wherein the calculated the progress information is displayed on the x-y graph, and wherein the food-product extracting comprises extracting a food product for which a Euclidean distance between the first feature quantity on the x-y graph and the progress information on the x-y graph is equal to or less than a reference value.

17. An information presenting method in an information presenting system which presents a food product meeting a user's preference, the method comprising:

by a computer of the information presenting system, inputting a single user evaluation value for each of a plurality of different examples of the food product, representing the degree of the user's preference for each of the plurality of examples of the food product;

displaying a point on an x-y graph for each of the plurality of different examples of the food product whose evaluation value is greater than a predetermined threshold, one axis of the x-y graph representing values of the amount of a first food-product component, and the other axis of the x-y graph representing values of the amount of a second food-product component;

setting a closed curve passing through or including the displayed points, and generating and displaying a region surrounded by the closed curve as a user preference region for the food product;

inputting by the user of a point on the graph in the user preference region, indicative of a preferred taste of the user with respect to the food product;

calculating a first feature quantity indicative of a feature of a taste indicated by the inputted point;

calculating, from a food product data base which stores a temporal change in a content of each of one or more components for each of one or more food products, progress information indicative of a temporal change in a second feature quantity indicative of a feature of the taste of each of the food products, and extracting a food product for which a Euclidean distance between the first feature quantity and the progress information is equal to or less than a reference value; and presenting the extracted food product, wherein the food product data base stores a temporal change in a representative value of a content of each of the first and second food-product components for each of the food products and stores a reference content of each of the first and second components for each of the food products, and wherein the method further comprises referring to measurement information which associates, with respect to each of the food products, the shipping date with a measurement value of each of the components on the shipping date, correcting, with respect to each of the food products, a content stored in the food product data base on a basis of a difference between the reference content and the measurement value, and calculating the progress information using the corrected content.

\* \* \* \* \*